United States Patent
Vasan et al.

(10) Patent No.: US 8,264,973 B2
(45) Date of Patent: Sep. 11, 2012

(54) METHOD AND SYSTEM FOR TIMESTEP STOCHASTIC SIMULATION FOR NETWORKS

(75) Inventors: Arunchandar Vasan, Chennai (IN); Ajjampur Udaya Shankar, Silver Spring, MD (US)

(73) Assignee: University of Maryland, College Park, MD (US)

(*) Notice: Subject to any disclaimer, the term of this patent is extended or adjusted under 35 U.S.C. 154(b) by 254 days.

(21) Appl. No.: 12/433,306

(22) Filed: Apr. 30, 2009

(65) Prior Publication Data

US 2009/0303887 A1    Dec. 10, 2009

Related U.S. Application Data

(60) Provisional application No. 61/049,172, filed on Apr. 30, 2008.

(51) Int. Cl.
*H04L 12/26* (2006.01)

(52) U.S. Cl. ........................................ 370/250

(58) Field of Classification Search ............... 370/241, 370/332, 333, 250
See application file for complete search history.

(56) References Cited

U.S. PATENT DOCUMENTS

| | | |
|---|---|---|
| 7,181,221 B1 * | 2/2007 | Mark et al. .................. 455/436 |
| 2004/0093421 A1 * | 5/2004 | Peng et al. .................. 709/232 |
| 2005/0003827 A1 * | 1/2005 | Whelan ....................... 455/454 |
| 2005/0190731 A1 * | 9/2005 | Bejerano et al. ............ 370/338 |
| 2006/0019679 A1 * | 1/2006 | Rappaport et al. ......... 455/456.5 |
| 2006/0133293 A1 * | 6/2006 | Pan et al. .................... 370/252 |
| 2008/0101331 A1 * | 5/2008 | Lee et al. .................... 370/350 |

FOREIGN PATENT DOCUMENTS

EP       1 746 770 A1 *   1/2007

* cited by examiner

*Primary Examiner* — Anh-Vu Ly
*Assistant Examiner* — Mohammad Anwar
(74) *Attorney, Agent, or Firm* — Arent Fox LLP

(57) ABSTRACT

A method and system for analytically simulating the state of a 802.11 WLAN network having a plurality of stations at discreet timesteps, including analytically generating a plurality of sample paths of a network state, including obtaining probability distribution values for aspects of the network. The probability distributions may be precomputed and stored in a cache to be accessed during a simulation of a network.

17 Claims, 17 Drawing Sheets

FIG. 10

SHRINK-LIST(*list*)

1   *shrunk-list* ← {}

▷ Input *list* has tuples of form

▷ (*weight*, (*mean*, *dev*))

2   Sort *list* according to increasing (*mean*, *dev*)

3   $(w_0, (m_0, s_0)) \leftarrow \text{first}(list)$

4   $w \leftarrow 0, m \leftarrow m_0, s \leftarrow s_0$ 5   for each successive $(w_k, (m_k, s_k))$ in *list*

▷ $\epsilon$ is a threshold 6      if $(w_k < \epsilon)$

▷ Ignore gaussian of very low weight

7         $w \leftarrow w + w_k$ 8      elseif $|m_k - m| \leq \theta m$ and $|s_k - s| \leq \theta s$ ▷ Combine two "close" gaussians ▷ Closeness parameter is $\theta$ 9         $p_1 \leftarrow w/(w_k + w)$ ; $p_2 \leftarrow w_k/(w_k + w)$ 10        $m \leftarrow p_1 m + p_2 m_k$; $s \leftarrow \sqrt{p_1 s^2 + p_2 s_k^2 + p_1 p_2 (m - m_k)^2}$ 11        $w \leftarrow w + w_k$ 12     else ▷ This entry cannot be combined anymore 13        Add $(w, (m, s))$ to *shrunk-list*

14        $w \leftarrow w_k, m \leftarrow m_k, s \leftarrow s_k$

15  Add $(w, (m, s))$ to *shrunk-list*

16  return *shrunk-list*

FIG. 11

SAMPLE-GOODPUTS(N, M)

▷ $\Pr(N_i|C_i), \Pr(N_A)$ are global to this routine

1  $count \leftarrow 1$

2  $allotted, expected, upper\text{-}tolerance, lower\text{-}tolerance \leftarrow 0$ 3  $\forall i \ N_i(t) \leftarrow 0$, $M \leftarrow$ number of active stations 4  $\pi \leftarrow$ random permutation of id's in M 5  $N_A(t) \leftarrow$ sample from $\Pr(N_A(t))$ 6  while $count < M$ and $allotted < N_A(t)$ 7      $i \leftarrow \pi(count)$ 8      if $allotted > expected + upper\text{-}tolerance$ 9          $s \leftarrow$ sample lower tail of $\Pr(N_i(t)|C_i(t))$ 10      elseif $allotted < expected - lower\text{-}tolerance$ 11          $s \leftarrow$ sample upper tail of $\Pr(N_i(t)|C_i(t))$ 12      else 13          $s \leftarrow$ sample from full distribution $\Pr(N_i(t)|C_i(t))$ 14      if $allotted + s \leq N_A(t)$ 15          $N_i(t) \leftarrow s$ 16      else 17          $N_i(t) \leftarrow N_A(t) - allotted$ 18      $allotted \leftarrow allotted + N_i(t)$ 19      $count \leftarrow count + 1$ 20      $expected \leftarrow count \times \frac{N_A(t)}{M}$ 21      $upper\text{-}tolerance \leftarrow \theta_1 \times expected$ 22      $lower\text{-}tolerance \leftarrow \theta_2 \times expected$ 23  if $(count = M)$ 24      $N_{\pi(M)}(t) \leftarrow max(N_A(t) - allotted, 0)$

FIG. 14

| Symbol | Stands for |
|---|---|
| $\alpha$ | number of stations |
| $\beta$ | retry limit |
| $\gamma$ | initial contention window size |
| $PKT$ | time to transmit a packet |
| $ACK$ | time to transmit an ACK |
| $SIFS$ | Short Inter-frame Spacing |
| $DIFS$ | DCF Inter-frame Spacing |
| $\tau$ | transmission interval; equals $PKT + SIFS + DIFS + ACK$ |
| For per-station attempt process: | |
| $C_i(t)$ | contention window size of station $i$ at time $t$ |
| $B_i(t)$ | backoff counter of station $i$ at time $t$ |
| $\langle C_i(t), B_i(t)\rangle$ | MAC state of station $i$ at time $t$ |
| For a tagged packet of a station: | |
| $Y_j$ | backoff duration for $j$ th attempt |
| For aggregate attempt process: | |
| $I$ | idle interval; variable interval between successive packet transmissions when all stations decrement their backoff counters |

FIG. 16

| Symbol | Stands for | Type within timestep |
|---|---|---|
| $\delta$ | timestep of TSS | constant |
| M | set of active stations | constant |
| $M$ | # of active stations, I.e., [M] | constant |
| For one tagged packet: | | |
| $K$ | number of transmission attempts | random variable |
| $Y_j$ | backoff duration for $j$ th attempt | random variable |
| $X$ | total backoff duration; equals $Y_1 + Y_2 + ... + Y_K$ | random variable |
| For per-station attempt process: | | |
| $p$ | per-station collision probability | constant |
| $N_i$ | goodput of station $i$ | random variable |
| For aggregate attempt process: | | |
| $P_A$ | aggregate collision probability | constant |
| $I$ | generic idle interval | random variable |
| $\eta$ | equals $E[I]/(E[I] + \tau)$ | constant |
| N | vector of $N_i$ for all $i$ | random variable |
| $N_A$ | aggregate goodput, $\Sigma_I N_I$ | random variable |
| $L$ | number of aggregate attempts for one aggregate success | random variable |

METHOD AND SYSTEM FOR TIMESTEP STOCHASTIC SIMULATION FOR NETWORKS

CLAIM OF PRIORITY UNDER 35 U.S.C. §119

The present application for patent claims priority to Provisional Application No. 61/049,172 filed on Apr. 30, 2008, titled TIMESTEPPED STOCHASTIC SIMULATION OF 802.11 WLANs, the entire contents of which are hereby expressly incorporated by reference herein.

STATEMENT OF GOVERNMENT SUPPORT UNDER 37 C.F.R. §401.14(f)(4)

This invention was made with government support under MDA90402C0428 awarded by the National Security Agency (NSA)."

BACKGROUND OF THE INVENTION

1. Field of the Invention

Aspects in accordance with the present invention relate to the simulation of network states for evaluating network performance, including simulation of wireless Local Area Network (WLAN) states.

2. Background of the Technology

Performance evaluation is crucial for the design, deployment, and evolution of computer networks. Performance evaluation is used both for research and development of new networks and for management and growth of existing computer networks. For example, the performance of proposed changes to a network infrastructure, be it hardware (e.g. a new wired or wireless link) or software (e.g. a new Voice over Internet Protocol or VoIP application), needs to be predicted prior to deployment.

Modern computer networks exhibit stochastic behavior, such as may be due to randomness in user activity, variations in router service time, random access based link scheduling, randomized queue management and application protocols, etc. These networks also typically rely extensively on non-linear state-dependent control mechanisms (e.g., Transmission Control Protocol TCP). These mechanisms may operate on small timescales, e.g., the round-trip time of a TCP connection. The use of such control means that small changes in the system state can lead to large changes in the system state over time. Thus, any performance evaluation technique must adequately handle the stochastic nature and state-dependent control of computer networks.

The two main approaches to performance evaluation of computer networks in the related art have involved use of analytical modeling and packet-level simulation. Of these, packet-level simulation has been the approach of choice, primarily because analytical methods have typically been unable to capture state-dependent control mechanisms adequately. Purely analytical methods simplify the model for the sake of tractability (e.g., Poisson arrivals, stationarity) to the extent that these predictions are considered by those in the field to be too inaccurate for performance evaluation purposes. On the other hand, packet-level simulation becomes prohibitively expensive as link speeds, workloads, and network size increase because it simulates every packet's arrival and departure at all relevant elements of the network.

Since the standardization of the 802.11 protocol suite, 802.11 WLANs, popularly referred to as WiFi, have become ubiquitously deployed for last-hop (end-user) connectivity to the Internet. 802.11 WLANs are also expected to be the medium of choice for mobile VoIP applications. Thus, dimensioning any network infrastructure typically involves 802.11 WLANs, and so fast performance evaluation of WLANs is essential.

Although performance evaluation of wired-cum-wireless networks is crucial, related art evaluation techniques are not adequate. The only viable related art method of performance evaluation of wired-cum-wireless computer networks is packet-level simulation, which simulates the computer network at the level of transmissions and receptions of individual packets. Packet-level simulation can be very accurate, but it is computationally very expensive, precisely because every packet transmission and reception is explicitly simulated, and link bitrates are increasing much faster than processing power. Current bitrates in a single WLAN cell, for example, are already 54 megabits per second (802.11a,g), and the next generation is expected to reach 135 Mbps (802.11n). Wired point-to-point links have even higher bitrates (e.g., tens of gigabits per second are common). A modern wired-cum-wireless network can consist of hundreds or thousands of such wired and WLAN links. Clearly, packet-level simulation of realistic wired-cum-wireless networks is practically unattainable.

Related art analytical model performance evaluation considered long-term averages for a constant number of active stations. A general approach of the related art would be to observe a tagged station between two successful transmissions and estimate the average time and number of attempts taken for the same, from which one obtains the long-run average per-station and aggregate goodput and collision probabilities.

The inventor's previously developed method of timestep stochastic simulation for networks of point-to-point links provides a very efficient alternative to packet-level simulation for networks of point-to-point links. However, this previous work, referred to here as TSS-PP, does not handle WLAN links.

Unlike a point-to-point link, a WLAN link is simultaneously shared among many users, resulting in strong statistical correlations between user throughputs both across users and over time. Two or more stations can transmit contemporaneously, resulting in a collision, which causes the transmitted packets to be dropped and each transmitting station to delay its next transmission attempt by more than if the transmission had been successful. TSS-PP does not capture these correlations, and thus can not provide simulations of WLANs, and hence of wired-cum-wireless networks, with any reasonable accuracy.

Therefore, a method and system for accurately capturing the stochastic nature of networks in a computationally efficient manner is needed.

SUMMARY OF THE INVENTION

Timestep Stochastic Simulation for WLANs (TSS-WLAN) in accordance with aspects of the present invention overcomes the above identified problems as well as others, and provides the accuracy of packet-level simulation but at orders less of computational cost. This approach is not affected by increasing the bitrate of the WLAN. For example, generating a 1000-second simulation of an 802.11 WLAN cell of 64 stations under heavy traffic conditions currently takes about 1 second on a standard desktop Personal Computer (PC), whereas even a stripped-down packet-level simulator is about 200 times slower.

TSS-WLAN in accordance with aspects of the present invention may also be used in conjunction with TSS-PP to achieve fast simulations and performance analysis for wired-cum-wireless networks. Further, both TSS-WLAN and TSS-PP can be significantly optimized and parallelized much more easily and effectively than packet-level simulation of the related art.

Aspects may include a method for evaluating the performance of a network, the method comprising: establishing a timestep value; analytically generating a plurality of sample paths of a network state, wherein each of the states is simulated at a discrete timestep and wherein each discrete timestep is separated by the established timestep value; and outputting network performance information based on the generated sample paths.

Aspects may further include outputting network performance information includes displaying or printing the network performance information.

The network may include shared links and non-shared links, and the network may comprise a WLAN.

Aspects of the method may further include determining a per-station collision probability; obtaining a probability distributions at each timestep $Pr[S(t+\delta)|S(t)]$ and $Pr[N(t))|S(t)]$, where t is time and $\delta$ is the timestep value, S(t) is the state of the network at time t, and N(t) is the goodput of the network at time t; and obtaining the state of the network from the probability distributions.

Aspects of analytically generating a plurality of sample paths of a network state may further comprise: precomputing distribution values and storing the distribution values, wherein the analytically simulating a state of the network includes obtaining at least one distribution value from the cache.

Aspects may further include a system for evaluating the performance of a network having $\alpha$ stations, the system comprising: means for establishing a timestep value; means for analytically generating a plurality of sample paths of a network state, wherein each of the states is simulated at a discrete timestep and wherein each discrete timestep is separated by the established timestep value, wherein the means for analytically generating a plurality of sample paths of a network state includes: means for determining a per-station collision probability; means for obtaining a probability distributions at each timestep $Pr[S(t+\alpha)|S(t)]$ and $Pr[N(t))|S(t)]$, where t is time, S(t) is the state of the network at time t, and N(t) is the goodput of the network at time t; and means for obtaining the state of the network from the probability distributions; and means for outputting network performance information based on the generated sample paths.

Aspects may further include a system for evaluating the performance of a network having $\alpha$ stations, the system comprising: means for establishing a timestep value; means for analytically generating a plurality of sample paths of a network state, wherein each of the states is simulated at a discrete timestep and wherein each discrete timestep is separated by the established timestep value, wherein the means for analytically generating a plurality of sample paths of a network state includes: means for obtaining the probability distribution of the instantaneous aggregate goodput at each timestep; means for sampling the instantaneous aggregate goodput at each timestep from the obtained probability distribution; for each station in the network, means for obtaining the probability distribution of an individual instantaneous goodput given the station's MAC state at the start of the timestep; means for dependently sampling the individual instantaneous goodput at each timestep from the obtained probability distribution; means for obtaining the probability distribution of the MAC state of each station at an adjacent timestep based on the MAC state and goodput at the previous timestep; and means for sampling the MAC state of each station at the adjacent timestep from the obtained probability distribution; and means for outputting network performance information based on the generated sample paths.

Aspects may further include a system for evaluating the performance of a network having $\alpha$ stations, the system comprising: a processor; a user interface functioning via the processor; and a repository accessible by the processor; wherein the user interface is configured to receive a timestep value; and the processor is configured to analytically generate a plurality of sample paths of a network state, wherein each of the states is simulated at a discrete timestep and wherein each discrete timestep is separated by the established timestep value, wherein analytically generating a plurality of sample paths of a network state includes: determining a per-station collision probability; obtaining a probability distributions at each timestep $Pr[S(t+\alpha)|S(t)]$ and $Pr[N(t))|S(t)]$, where t is time, S(t) is the state of the network at time t, and N(t) is the goodput of the network at time t; and obtaining the state of the network from the probability distributions; and wherein the user interface is configured to output network performance information based on the generated sample paths.

Aspects of the system may further include the network performance information being output via display or printing; the processor is housed on a terminal; the terminal being selected from a group consisting of a personal computer, a minicomputer, a main frame computer, a microcomputer, a hand held device, and a telephonic device; the processor being housed on a server; the processor being housed on a server, wherein the server is selected from a group consisting of a personal computer, a minicomputer, a microcomputer, and a main frame computer; the processor being housed on a server, wherein the server is coupled to a network; the processor being housed on a server, wherein the server is coupled to the Internet; the processor being housed on a server, wherein the server is coupled to the network via a coupling such as a wired connection, a wireless connection, and a fiberoptic connection; the repository being housed on a server; the repository being housed on a server, wherein the server is coupled to a network; and the respository being configured to store precomputed distribution values, wherein the processor is configured to obtain at least one distribution value from the repository.

Aspects may include a computer readable storage medium having instructions stored therein for causing a computer to carryout a method of simulating a network, the method comprising establishing a timestep value; analytically generating a plurality of sample paths of a network state, wherein each of the states is simulated at a discrete timestep and wherein each discrete timestep is separated by the established timestep value, wherein analytically generating a plurality of sample paths of a network state includes: determining a per-station collision probability; obtaining a probability distributions at each timestep $Pr[S(t+\alpha)|S(t)]$ and $Pr[N(t))|S(t)]$, where t is time, S(t) is the state of the network at time t, and N(t) is the goodput of the network at time t; and obtaining the state of the network from the probability distributions; and outputting network performance information based on the generated sample paths Aspects may further include the computer readable storage medium wherein, the method further comprises: precomputing distribution values and storing the distribution values, and wherein analytically generating a plurality of sample paths of a network state includes obtaining at least one distribution value from the cache.

Aspects may further include a computer readable storage medium having instructions stored therein for causing a computer to carryout a method of simulating a network, the method comprising: establishing a timestep value; analytically generating a plurality of sample paths of a network state, wherein each of the states is simulated at a discrete timestep and wherein each discrete timestep is separated by the established timestep value, wherein analytically generating a plurality of sample paths of a network state comprises: obtaining the probability distribution of the instantaneous aggregate goodput at each timestep; sampling the instantaneous aggregate goodput at each timestep from the obtained probability distribution; for each station in the network, obtaining the probability distribution of an individual instantaneous goodput given the station's MAC state at the start of the timestep; dependently sampling the individual instantaneous goodput at each timestep from the obtained probability distribution.

Aspects may further include the computer readable storage medium wherein, the method further comprises: precomputing distribution values and storing the distribution values, and wherein analytically generating a plurality of sample paths of a network state includes obtaining at least one distribution value from the cache.

Additional advantages and novel features of aspects of the present invention will be set forth in part in the description that follows, and in part will become more apparent to those skilled in the art upon examination of the following or upon learning by practice thereof.

BRIEF DESCRIPTION OF THE FIGURES

In the drawings:

FIG. 10 illustrates an exemplary method implementing a list shrinking algorithm in accordance with aspects of the present invention.

FIG. 11 illustrates an exemplary method for sampling a per-station goodput in accordance with aspects of the present invention.

FIG. 14 illustrates notations for 802.11 network operations in accordance with aspects of the present invention.

FIG. 16 illustrates symbol information and modeling assumptions in accordance with aspects of the present invention.

DETAILED DESCRIPTION

Figure 1:
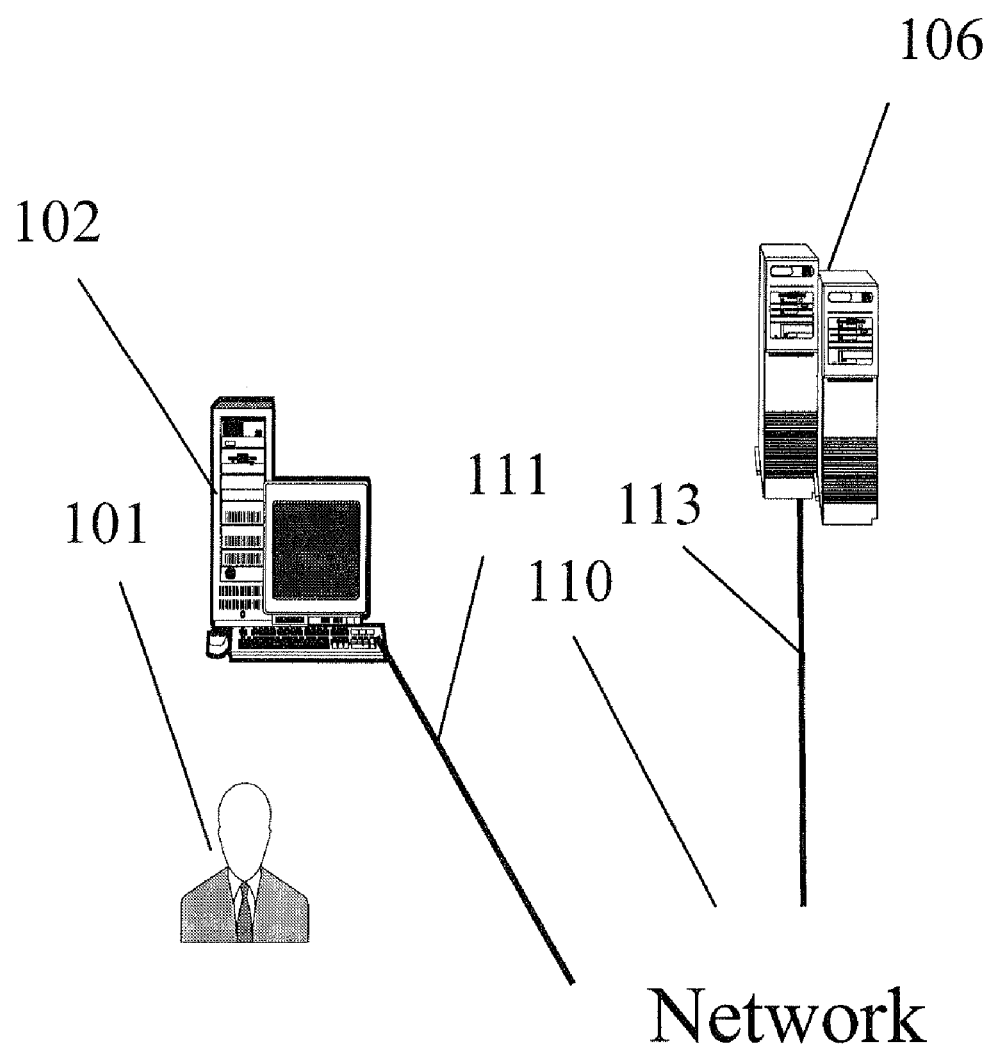
FIG. 1 illustrates exemplary features of a computer system in accordance with aspects of the present invention.

FIG. 1 shows various features of an example computer system for use in conjunction with aspects of the present invention. As shown in FIG. 1, the computer system may be used by a user 101 to access data, make calculations, and perform other steps or actions in accordance with aspects of the present invention, such as by using software and other computer features located on a server or other network device 106. Access may occur, for example, via a terminal 102, network (e.g., the Internet) 110, and couplings 111, 113. The terminal 102 may comprise, for example, a personal computer (PC), minicomputer, mainframe computer, microcomputer, telephone device, personal digital assistant (PDA), or other hand-held or other device having a processor and input capability. The server 106 may comprise, for example, a PC, minicomputer, mainframe computer, microcomputer, or other device having a processor and a repository for data or that is capable of accessing a repository of data. Couplings 111, 113 may include wired, wireless, or fiberoptic links.

Figure 2:
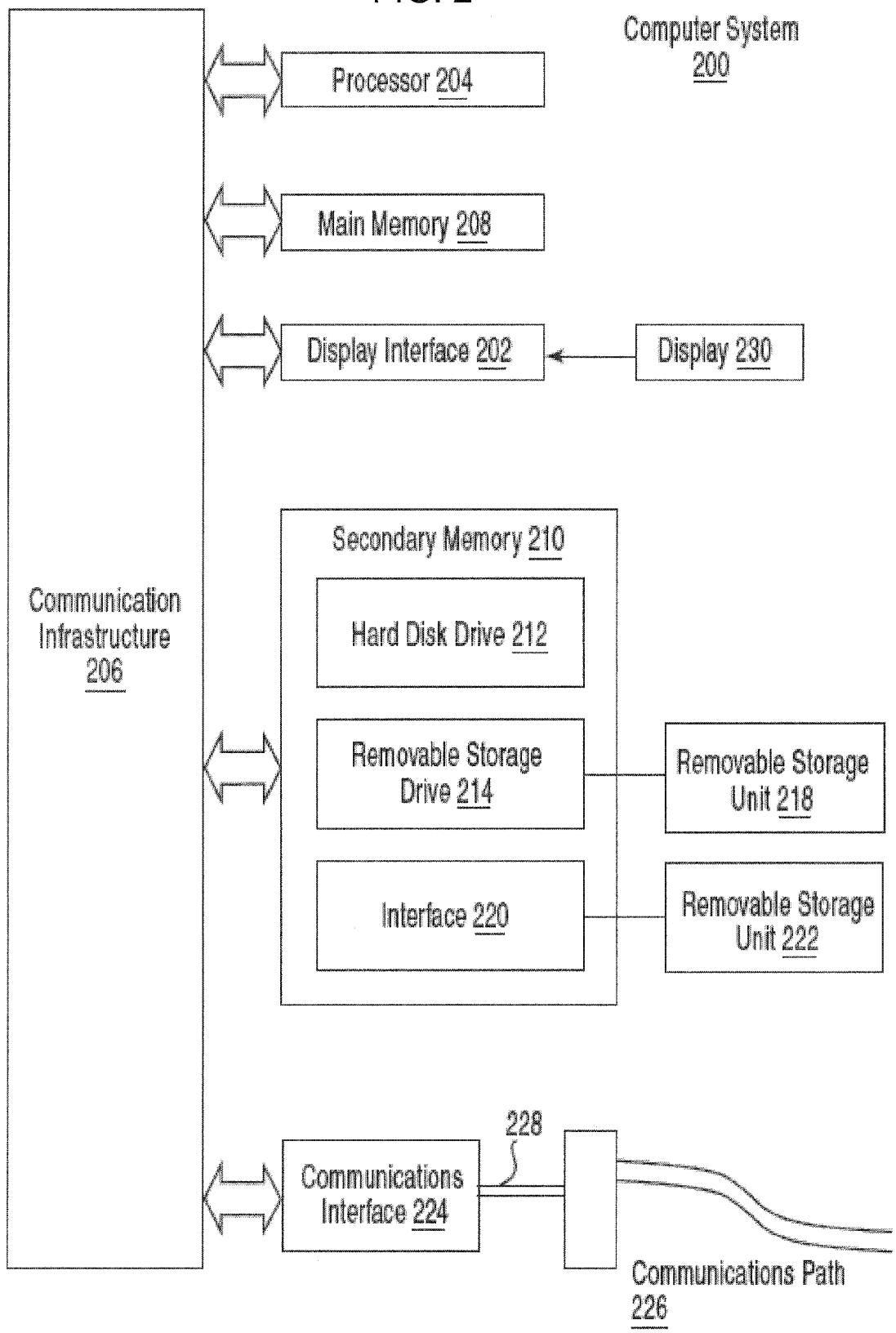
FIG. 2 illustrates exemplary features of a computer system in accordance with aspects of the present invention.

Aspects of the present invention may be implemented using hardware, software or a combination thereof and may be implemented in one or more computer systems or other processing systems. In one variation, the invention is directed toward one or more computer systems capable of carrying out the functionality described herein. An example of such a computer system 200 is shown in FIG. 2.

Computer system 200 includes one or more processors, such as processor 204. The processor 204 is connected to a communication infrastructure 206 (e.g., a communications bus, cross-over bar, or network). Various software aspects are described in terms of this exemplary computer system. After reading this description, it will become apparent to a person skilled in the relevant art(s) how to implement aspects of the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable/readable storage medium having stored therein computer software and/or data.

In alternative variations, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium," "computer usable medium," and "computer readable storage medium" are used to refer generally to media such as a removable storage drive 214, a hard disk installed in hard disk drive 212, and signals 228. These computer program products provide software to the computer system 200. Aspects of the invention are directed to such computer program products.

Computer programs (also referred to as computer control logic or instructions for causing a computer to carry out a method) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In a variation where the invention may be implemented using software, the software may be stored in a computer program product and loaded into computer system 200 using removable storage drive 214, hard drive 212, or communications interface 224. The control logic or instructions for causing a computer to carry out a method (software), when executed by the processor 204, causes the processor 204 to perform the functions of the invention as described herein. In another variation, the invention may be implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the invention may be implemented using a combination of both hardware and software.

I. Timestepped Analysis

Aspects in accordance with the present invention include a method and system for achieving the modeling accuracy similar to packet-level simulation of network performance at a fraction of the computational cost. Aspects include generating sample paths of the network state, similar to packet-level simulation. However, these sample paths are generated only at discrete timesteps, not at each packet transmission. By selecting an appropriate timestep size, network performance may be simulated and analyzed by analytically generating sample paths of the network state in an accurate an efficient manner. Each of the sample paths may be generated at discrete timesteps.

Thus, if $S(t)$ represents the network state at time t, aspects include analytically generating $S(t)$ for $t=\delta, 2\delta, 3\delta, \ldots$, given $S(0)$, where $\delta$ is a selected timestep distance. This overcomes the scalability problems of packet-level simulation in networks having shared links, such as WLANs, by generating a sample path of a system being analyzed at timesteps $t=\delta, 2\delta, 3\delta, \ldots$, rather than at each packet transmission.

In another aspect, sample paths of the network state may be generated using a distribution function or a plurality of distribution functions that may be precomputed and stored in a cache for access during a network simulation. For example, at each timestep, $[t, t+\delta]$, the distribution $Pr(S(t+\delta)|S(t))$ may be obtained analytically assuming that all stochastic inputs are time-invariant in $[t, t+\delta]$, and $S(t+\delta)$ may be sampled from it. In order for the time-invariance assumption to hold, $\delta$ may be less than the feedback time-scale of the end-to-end control mechanisms employed (e.g., TCP's Round Trip Time "RTT").

Other aspects may include computing sample paths of instantaneous goodput $N_i(t)$ for all stations i in a WLAN over timesteps of length $\delta$. Again, for accurate modeling of higher layer protocols, $\delta$ may be less than the control timescales for such higher layer protocols. Among others, a higher layer protocol may include a TCP protocol, with the corresponding timescale for the TCP protocol being the TCP's RTT. For example, $\delta$ may be about 50 ms. At this timestep value, $N_i(t)$'s may be correlated across both timesteps (e.g., a station with high contention window has low goodput for several timesteps) and stations (e.g., because they share the same media, one station getting high goodput in a timestep necessarily decreases the goodput of other stations in that timestep). To model these correlations, one obtains, jointly with goodputs $N_i(t)$s, sample paths of the WLAN's Distributed Coordination Function (DCF) state, which consists of a contention window and a backoff counter at each station. DCF is the basic Media Access Control (MAC) protocol of 802.11, and the terms "DCF" and "MAC" are used interchangeably herein.

Thus, a number of other aspects of the WLAN's performance may be obtained, such as the distribution of the instantaneous aggregate goodput; the distribution of instantaneous goodput of a tagged station conditioned on its DCF state; quantification of short-term goodput unfairness conditioned on the DCF state; efficient accurate approximation for the n-fold convolution of the distribution of the total backoff duration experienced by a tagged packet; and a simple closed form expression and its logarithmic approximation for collision probability as a function of the number of active stations.

$S(t)$ represents the state of a network at time t, defined by such features as the network topology, the routing table entries, the output queue sizes of the WLAN interfaces, the amount of data remaining to be sent at the source and at each intermediate link, and so on. Performance metrics, $F[S(t)]$, based on the state of the network are considered in a performance analysis of the network. Among others, such performance metrics may include the time when all application flows have completed, the maximum size attained by the packet queue of a link, and the fraction of packets that were lost and had to be re-transmitted.

A fundamental feature of computer networks (and computer systems in general) is that they are not deterministic but stochastic. Components of the network have inherent randomness. For example, in a wired link, the time needed for a router to forward a packet is not fixed, but varies due to unpredictable delays in the router's software and hardware. Stochastic behavior is even more prominent in a WLAN link, because the time required by a station to transmit a packet is determined by a randomized media access protocol. Hence, the network has not just one single time evolution, but rather an enormous number of possible evolutions, each with a particular probability of occurrence.

The sample paths can vary greatly, and can have very different values of the performance metric. This diversity arises because of the (nonlinear) state-dependent control present in most computer networks. Small changes in observed state result in small changes in behavior over small time scales, but lead to large changes and diverse evolutions over large time scales. In routing, for example, a small difference in link cost causes a change in next hops, which then gradually affects traffic flows throughout the network. In congestion control, for example, a small delay in a packet arrival may trigger a timeout, after which the sample path would be very different than if the timeout had not occurred. In a WLAN link, a few packet collisions can cause a transmitting station to become quiescent for a relatively long interval of time.

Because the number of sample paths is very large (typically infinite), the performance analyst is typically interested not in the individual values of a performance metric F for different sample paths, but rather the average value, say $F_{avg}$, over all the possible sample paths. In general, one may also be interested in other moments, such as the variance.

As discussed above, packet level simulation may be used to compute F for each path and then averaged to produce the compounded values. Although this approach provides an estimate of $F_{avg}$ having a confidence level dependent on the number of sample paths generated, this approach can be computationally expensive and become unmanageable with increasing link bandwidth in the analyzed network. In response, analytical evaluation methods may attempt to calculate $F_{avg}$ without computing the various sample paths, but these analytical methods may make so many simplifying assumptions that the estimates produced may be too inaccurate to be of practical use. In particular, previous analytical methods for WLAN links may look only at long-term averages and not capture crucial short-term variations in instantaneous averages.

TSS-WLAN includes generating a sample path at time steps, $t=\delta, 2\delta, 3\delta, \ldots$, rather than at each packet transmission. At each timestep, $t=\delta, 2\delta, 3\delta, \ldots$, the distributions $Pr(S(t+\delta)|S(t))$ and $Pr(N(t)|S(t))$, may be obtained analytically. Then $S(t)$ and $N(t)$ at $t=\delta, 2\delta, 3\delta, \ldots$, may be sampled from the distributions.

II. Obtaining Goodput and MAC State

The MAC state of the WLAN at time t includes the contention window $C_i(t)$ and the backoff counter $B_i(t)$ for every station i. The goodput of a station i, $N_i(t)$, is defined as the number of packets successfully transmitted by station i in timestep t. The throughput of station i in the timestep includes all unsuccessful attempts as well. The goodput of the network, $N(t)$, is the collection of goodputs $N_i(t)$ for every station i at the timestep. $N_i(t)$ is zero for a station i that is inactive at timestep t. For a station i active at t, $N_i(t)$ depends on all the active stations at t, for example, as determined by the 802.11 MAC protocol. Among others, the MAC protocol may be the 802.11 Distributed Coordination Function (DCF) Protocol.

The DCF protocol introduces strong dependencies in the $N_i(t)$s, specifically, positive correlation in $N_i(t)$ across timesteps and a negative correlation between $N_i(t)$s across stations i in the same timestep. The current MAC state influences the future attempts (rate) made by a station, and in turn, depends on the attempts and successes of a station in the past. The dependency is such that it gives rise to a positive correlation in a station's goodput $N_i(t)$ across timesteps t. Because all active stations share the same channel and have load availability throughout the timstep, a high goodput for a station in a timestep necessarily implies that the goodputs of other stations in the timestep have to go down. Hence, there is a negative correlation between the goodputs $N_i(t)$s of stations across i within a timestep.

It is beneficial to capture these dependencies, otherwise, the evolutions of the $N_i(t)$s would not be an adequate foundation for simulating upper-level protocols (e.g., TCP) in a timestepped manner. Thus, the key issue is the short-term behavior of the DCF protocol.

Aspects of the present invention include computing evolutions of the goodputs and DCF states of all stations jointly: at each timestep, the goodput and DCF state at the end of the timestep is obtained in terms of the goodput and DCF state at the end of the previous timestep, accounting for correlations both across timesteps and across stations. This provides an accurate approximation of network performance in terms of the resulting marginal distributions, the crosscorrelations (across stations), and the autocorrelations (across timesteps) of the per-station instantaneous goodput and DCF state. This also yields runtime speedup of up to two orders of magnitude.

In order to compute sample path evolutions, the goodputs and the MAC states, $\{C_i(t+\delta), B_i(t+\delta), N_i(t)$ for all stations$\}$, is probabilistically obtained given $\{C_i(t), B_i(t)$ for all stations$\}$, accounting for correlations both across stations and across time.

Thus, one issue addressed is the short-term behavior of the MAC protocol, for example the DCF protocol. Aspects in accordance with the present invention include computing evolutions of the goodput vector and WLAN DCF state jointy: at each timestep, the goodput and DCF state at the end of the timestep may be obtained, in terms of the goodput and DCF state at the previous timestep.

The 802.11 Distributed Coordination Function (DCF), which is a basic MAC protocol in WLANs, is an example of such a MAC protocol. This function provides random access augmented with a history. The 802.11 DCF is a variant of Carrier Sense Multiple Access (CSMA) that is designed to perform Collision Avoidance (CA). The stations in a WLAN operate on a common slotted timeline. Each station uses a time-based procedure to adapt its MAC state, and, hence, its transmission attempts, to the current level of contention.

The MAC state of a station i is given by the tuple $<C_i(t); B_i(t)>$, where $C_i(t)$ is the contention window and $B_i(t)$ is the backoff counter at time t. When station i has a packet to send, it continuously decrements $B_i(t)$ at the rate of one unit per slot, pausing only when the channel is sensed to be busy. The station transmits when $B_i(t)$ reaches zero. If the transmission is unsuccessful (e.g., ACK not received) $C_i(t)$ is doubled; otherwise, $C_i(t)$ is reset to a specified initial value. In either case, a new value of $B_i(t)$ is chosen uniformly at random from $[0 \ldots C_i(t)-1]$.

As an illustrative example, consider an 802.11 WLAN with a stations, where each station i is either active or inactive over time, and with transitions occurring only at timestep boundaries. A station that is active (inactive) at time t has (no) packets to send in its output queue throughout $[t; t+\delta]$. (The output queue is fed, in general, by state-dependent data sources, e.g., TCP.) Let $M(t)$ be the vector of length $\alpha$ whose $i^{th}$ entry indicates whether station i is active, and $M(t)$ be the number of active stations in $M(t)$.

Let $N_i(t)$ denote the goodput of station i in timestep $[t; t+\delta]$, defined as the number of packets successfully transmitted by station i in the timestep. (The throughput of station i in the timestep includes all unsuccessful attempts, as well.) $N_i(t)$ is zero for a station i inactive at t. For a station i active at t, $N_i(t)$ depends on all the active stations at t, as determined by the 802.11 MAC protocol.

Aspects of the present invention include computing evolutions of the goodputs $N_i(t)$'s for all stations: for t=0; δ; 2δ; . . . . For the timestep size δ of interest (i.e., δ=50 ms), the DCF protocol introduces strong dependencies in the $N_i(t)$'s; specifically, positive correlation occurs in $N_i(t)$ across timesteps, and negative correlation occurs between $N_i(t)$'s across stations i in the same timestep.

The current MAC state influences the future attempts (rate) made by a station, and in turn, depends on the attempts and successes of a station in the past in such a way as to give rise to positive correlation in a station's goodput $N_i(t)$ across timesteps t.

Because all active stations share the same channel and have load available throughout the timestep, a high goodput for a station necessarily implies that the goodputs of other stations have to go down. Hence, there is negative correlation between the goodputs Ni(t)'s of stations across i within a timestep.

In accordance with aspects of the present invention it is essential to capture these dependencies, otherwise the evolutions of the $N_i(t)$'s would not be an adequate foundation for simulating upper-level protocols (e.g., TCP) in a timestepped manner. Thus one key issue is the short-term behavior of the DCF protocol. Aspects of the present invention include computing evolutions of the goodputs and DCF states of all (or nearly all) stations jointly: at each timestep, the goodput and DCF state at the end of the timestep is obtained in terms of the goodput and DCF state at the previous timestep.

In one variation, in order to compute sample path evolutions of the goodputs and the MAC states, one may probabilistically obtain $<C_i(t+\delta);B_i(t+\delta);N_i(t)$ for all stations>, given $<C_i(t);B_i(t)$ for all stations> accounting for correlations both across stations and time.

Figure 3:
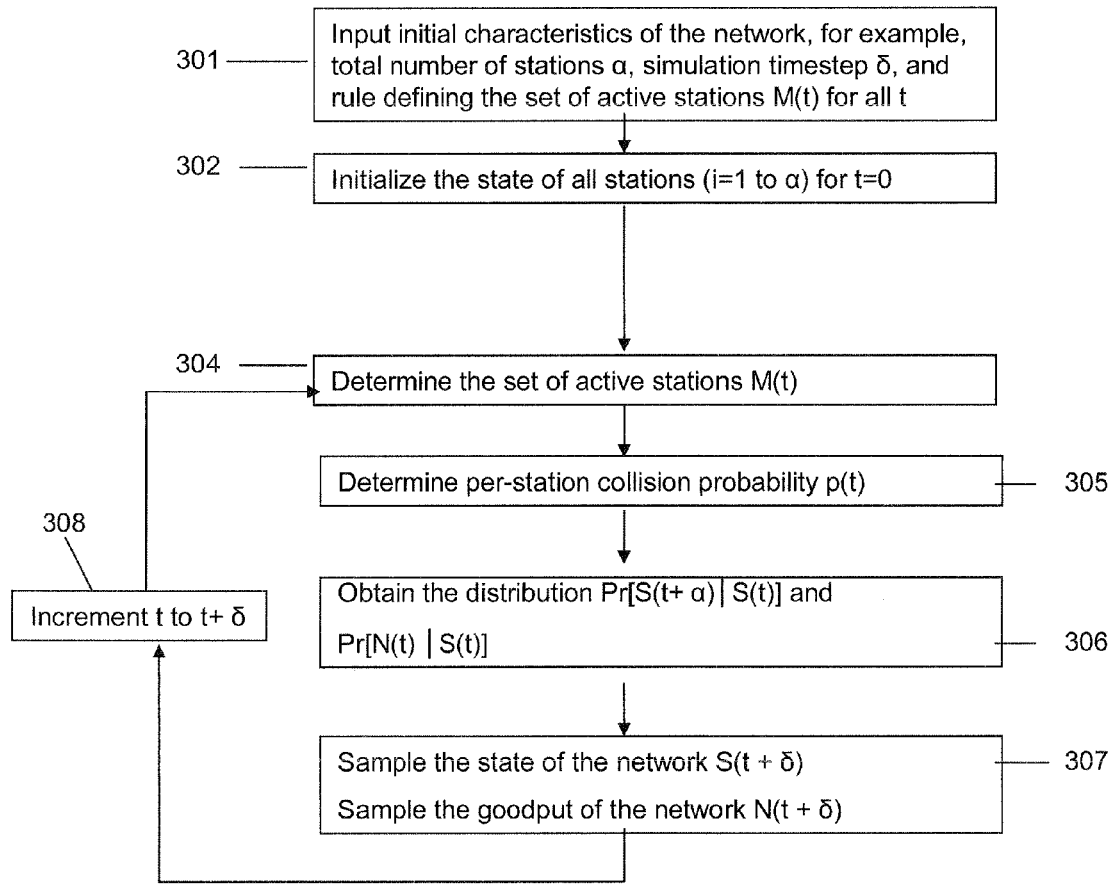
FIG. 3 illustrates an exemplary method of simulating sample states of a WLAN network in accordance with aspects of the present invention.
Figure 4:
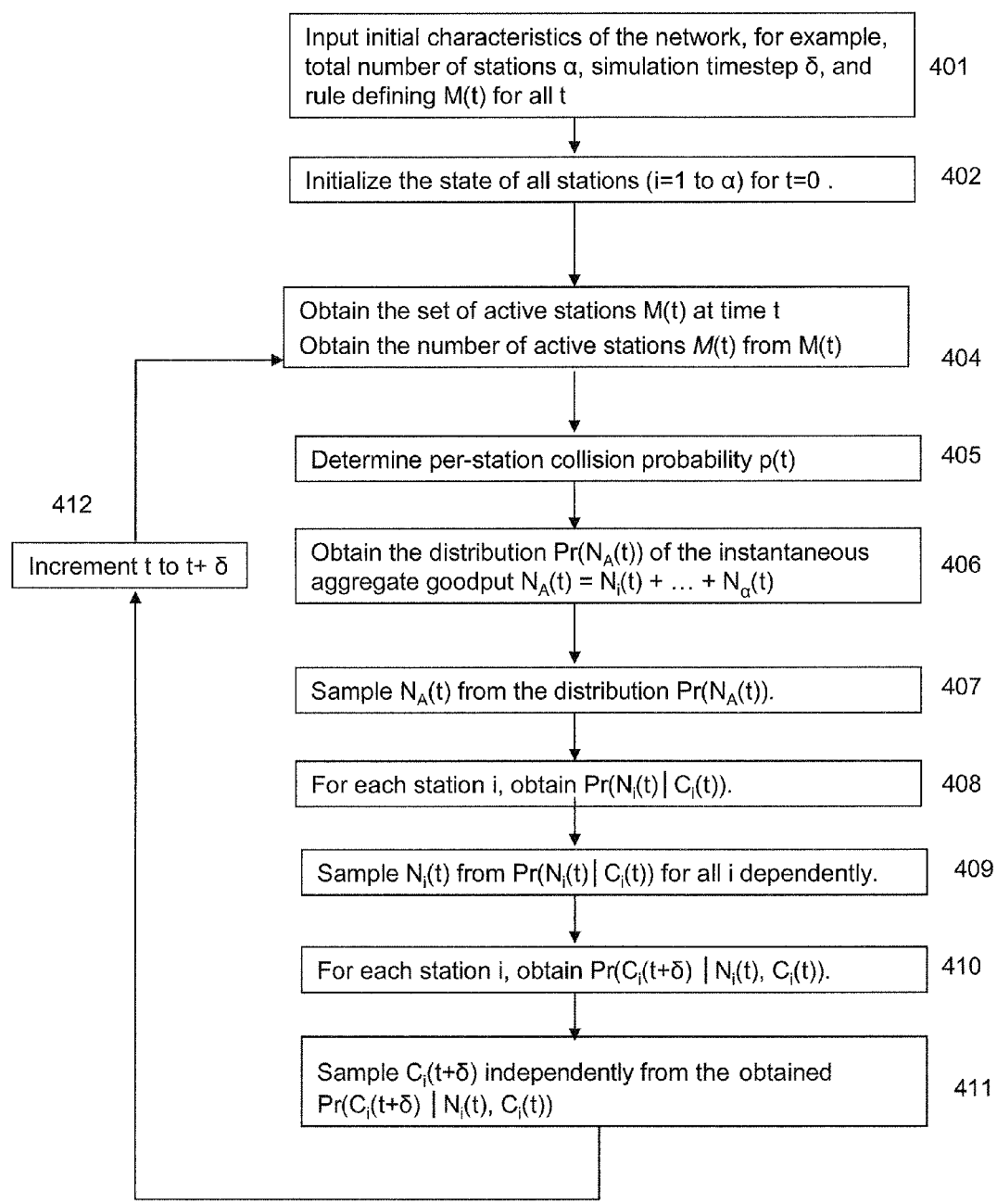
FIG. 4 illustrates an exemplary method of simulating sample states of a WLAN network in accordance with aspects of the present invention.

FIGS. 3 and 4 illustrate exemplary actions that may be taken in simulating the state of the network at the selected timesteps, in accordance with aspects of the present invention.

FIG. 3 illustrates aspects of a method for simulating network performance in accordance with aspects of the present invention. In step 301, initial characteristics of the network are input. These characteristics may be input by a user at a user interface, for example. Among others, such characteristics may include a total number of stations for the network α, a simulation timestep size δ, and a rule defining the set of active stations M(t) for all time t. The rule defining M(t) may define M(t+δ) in terms of the simulation thus far (over [0, t]) and may depend on the outputs of higher layer protocols that feed into the output queues of the station).

In 302, the state of all stations (from station i=1 to α) at time t=0 is initialized, which includes initializing each station's MAC state to its DCF-defined initial value. In 304, the set of active stations, M(t), is determined (using the rule defining M(t) for all time t), and the number of active stations M(t) is determined from M(t), In 305, the corresponding collision probability p(t) is determined. This result may be determined as a function of the number of active stations M(t) at time t. The value of p(t) can be computed at the time of a simulation run, or the value may be precomputed and stored in a cache and retrieved when needed. The cache may be populated either before the simulation begins or during a simulation run itself.

In 306, the distributions Pr[S(t+δ)|S(t)] and Pr[(N(t)|S(t)] are obtained. Then, the state of the network at time t+δ, S(t+δ), and the goodput vector in timestep [t, t+δ], N(t), can be obtained at 307. In 308, time t is incremented by the timestep δ, and steps 304-308 are repeated until the desired simulation duration is reached. The simulation duration may be a value that is received from a user at a user interface, for example.

The state of the WLAN at time t, S(t), includes the contention window $C_i(t)$ and backoff counter $B_i(t)$ for each station in the network Due to the complexity of solving for Pr[S(t+δ)|S(t)] and Pr[(N(t)|S(t)], a number of intermediate steps may be used. Among others, the steps may include those described in connection with the network simulation method in FIG. 4.

FIG. 4 illustrates a method for obtaining sample path evolutions of the goodputs and the MAC states for a plurality of stations in a shared link network, such as a WLAN. In the MAC state of a station, the backoff counter's value can be statistically obtained from the contention window's value. Thus the method simplifies to probabilistically obtaining $<C_i(t+\delta), N_i(t)$ for all stations> given $<C_i(t)$ for all stations>.

In 401 in FIG. 4, initial characteristics of the network are input. Among others, such characteristics may include a total number of stations for the network a, a simulation timestep size δ, and a rule defining the set of active stations M(t) for all time t. The rule defining M(t) may define M(t+δ) in terms of the simulation thus far (over [0, t]) and may depend on the outputs of higher layer protocols that feed into the WLAN queue)

In 402, the state of all stations (from station i=1 to α) at time t=0 is initialized, which includes initializing each station's contention window to its DCF-defined initial value. In 404, the set of active stations, M(t), is determined (using the rule defining M(t) for all time t), and the number of active stations M(t) is determined from M(t), In 405, the corresponding collision probability p(t) is determined. This may be determined as a function of the number of active stations M(t) at time t. The value of p(t) can be computed at the time of a simulation run, or the value may be precomputed and stored in a cache and retrieved when needed. The cache may be populated either before the simulation begins or during a simulation run itself.

In 406, the distribution $Pr(N_A(t))$ of the instantaneous aggregate goodput $N_A(t)$ is obtained. The instantaneous aggregate goodput is the sum of the goodput for each of the individual stations, or $\Sigma N_i(t)$ for all stations i=1 to α. This distribution can be obtained given the collision probability p(t) and the number of active stations M(t) at time t. $Pr(N_A(t))$ may be approximated by a normal distribution dependent on δ. For example, first, from the number of active stations, the distribution of the idle interval may be obtained. Then, using the idle interval distribution, the first two moments of the time taken for one success in the aggregate attempt process may be obtained. Then, the central limit theorem for renewal processes may be applied to obtain the normal distribution of the instantaneous aggregate goodput. Further description of this determination is provided below in section III.

In 407, the instantaneous aggregate goodput $N_A(t)$ is sampled from distribution $Pr(N_A(t))$.

In 408, for each station i, the distribution $Pr(N_i(t)|C_i(t))$ is obtained. This distribution may be obtained by abstracting the interaction with the rest of the stations by a collision in each attempt with previously obtained probability p(t). This marginal goodput distribution for each station is obtained given its MAC state at t. Aspects in accordance with the present invention include using the fact that $C_i(t)$ (stochastically) determines the instant $t_s$ when the first successful transmission of station i occurs in [t, t+δ]. Conditioned on $t_s$, the distribution of the number of successful packet transmissions in the interval $[t_s, t+\delta]$ is obtained by identifying how many total backoff durations (one for each successful packet transmission; aborts are explained later) can "fit" within this interval. Unconditioning on $t_s$ gives $Pr(N_i(t)|C_i(t))$. This analysis may make use of a real-to-backoff timeline contraction approximation. Further aspects of this step are discussed in more detail below in section IV.

In 409, the individual goodput for each station $N_i(t)$ is dependently sampled from the marginal goodput distributions for all i, such that the sampled $N_i(t)$s are correlated and add up to $N_A(t)$. This may include using a randomized algorithm that enforces a negative correlation constraint among any subset of stations, in addition to the constraint that the sampled add up to the sampled $N_A(t)$. For example, the method may consider stations according to a random permutation of their ids. Each station is allocated goodput from a specific part of its marginal distribution depending on the sum of all goodputs allocated prior to it and the aggregate goodput constraint. Further aspects of this operation 409 are discussed in more detail in section V.

In 410, for each station i, the distribution $Pr[C_i(t+\delta)|N_i(t), C_i(t)]$ is obtained. Thus, the new MAC state distribution at $t+\delta$, $C_i(t+\delta)$, is obtained, conditioned on the old MAC state at t, $C_i(t)$, and its goodput sample $N_i(t)$. This distribution is obtained by accounting for the total backoff durations spent in the $N_i(t)$ successful transmissions in the timestep $[t, t+\delta]$. This gives the last successful transmission time instant within the timestep. From this, the new MAC state distribution may be obtained from the observation that the attempt process started afresh at $t_f$ and has not successfully transmitted until the end of the timestep. Further aspects of this operation 410 are described in more detail in section VI.

In 411, the new MAC state at time $t+\delta$, $C_i(t+\delta)$, for each station i is sampled from the distribution obtained in operation 410.

In 412, time t is incremented by the timestep $\delta$, and steps 404-412 are repeated until the desired simulation duration is reached. The simulation duration may be a value that is input by a user at a user interface.

Thus, the probability distributions $Pr(S(t+\delta)|S(t))$ and $Pr(N(t)|S(t))$ are obtained analytically at each timestep. Then, the network state at time $t+\delta$, $S(t+\delta)$, and the goodput vector $N(t)$ are sampled from the obtained distribution. Applying this repeatedly, the simulated state of the network may be obtained at each of the timesteps.

Each of the probability distributions discussed in connection with FIG. 3 and FIG. 4 can be precomputed and cached across timestepped stochastic simulation runs because they can be parameterized in terms of the collision probability (or the number of active stations) and the timestep length $\delta$. The precomputation may be made in advance of the simulation, or may occur during the simulation and stored in a cache. This allows the computations to be a one-time cost for all sample paths of the same simulation scenario. The precomputed pdfs may be stored, for example, as tables of the inverse of the corresponding cdf. This would allow sampling from these precomputed distributions to be equivalent to indexing into the tables, an O(1) operation.

Alternatively, the values may be computed as needed during a simulation of a network. Thus, the distributions may be obtained or determined by either computing the distribution or by looking up a precomputed value for the distribution.

III. Obtaining the Probability Distribution $Pr(N_A(t))$

The probability distribution $Pr(N_A(t))$ is obtained in connection with step 406 in FIG. 4. From the number of active stations, the distribution of an idle interval may be obtained. Using the idle interval distribution, the first two moments of the time taken for one success in the aggregate attempt process may be obtained, using which, the distribution of the instantaneous aggregate goodput may be obtained.

As noted above, the per-station collision probability p is available as a function of the number of active stations M. Given this relationship, the distribution of $N_A(t)$ in $[t; t+\delta]$ may be obtained in terms of the number of active stations M(t) in timestep t and the timestep duration $\delta$.

a. Per-Station Attempt Process

Figure 5:
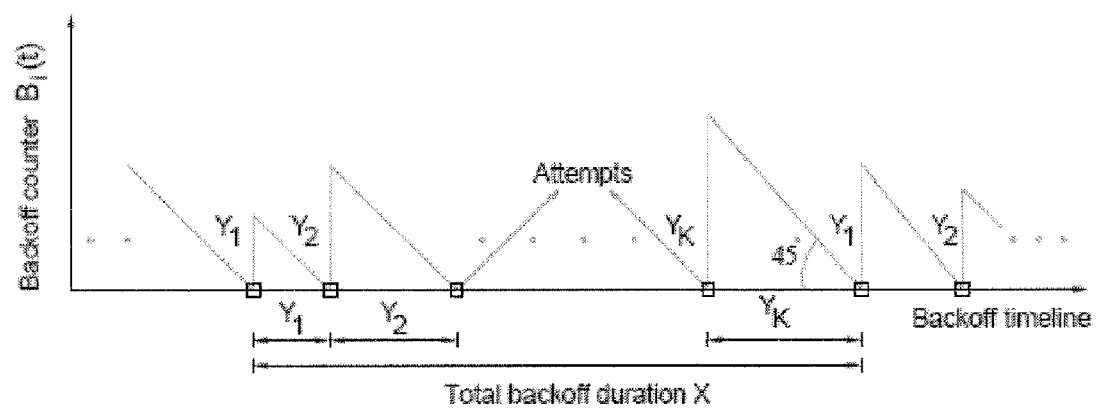
FIG. 5 illustrates an exemplary backoff duration.

FIG. 5 illustrates a per-station attempt process of station i in a backoff timeline driven by backoff counter $B_i(t)$. Attempts are made when $B_i(t)$ hits zero, and $B_i(t)$ is renewed according to the backoff process. FIG. 5 shows the evolution in the backoff timeline of $B_i(t)$ of a station i attempting to transmit a tagged packet. The angle 45° indicates that $B_i(t)$ decreases with slope −1 everywhere except at the attempt points. On reaching zero, $B_i(t)$ is renewed according to the backoff process under our modeling assumption that each transmission results in a collision with probability p.

Thus the attempt process of a station i is a sequence of intervals with the pattern <Block><Block> . . . . Each <Block> being of the form $Y_1, Y_2, \ldots, Y_K$, where there is a transmission after each $Y_i$; the transmission after $Y_K$ alone is successful; and the total backoff duration X for a successful transmission is $Y_1+Y_2+\ldots+Y_K$.

In the backoff timeline, $B_i(t)$ is a markovian renewal process with average overall cycle (renewal) period $E[X]$ and average number of attempts in a cycle $E[K]$. By the renewal reward theorem in S. M. Ross., *Introduction to Probability Models*, Academic Press, Inc., 2000, the entire contents of which are incorporated herein by reference, the attempt rate $\lambda$ is given by $E[K]/E[X]$. In other words; the probability that a station transmits at the start of a given slot in the backoff timeline is $\lambda$.

$E[K]$ and $E[X]$ may be calculated as follows. Each $Y_i$ is chosen from Uniform$[0 \ldots y2^{i-1}-1]$, and so $E[Y_i]=y2^{i-1}-\frac{1}{2}$. We have $$E[X] = \sum_{i=1}^{i=\beta} Pr(K = i) \cdot E[Y_1 + Y_2 + \ldots + Y_i].$$

Because each attempt is Bernoulli with failure probability p, K is a truncated geometric random variable with the distribution $Pr(K=i)=(1-p)p^{i-1}$ for $1 \leq i \leq \beta$ and
$Pr(K=i)=p^{\beta-1}$ for $i=\beta$, where $\beta$ is the retry limit.

b. Aggregate Attempt Process

The aggregate attempt process is the superposition of the per-station attempt processes. In the backoff timeline, the aggregate attempt process is a sequence of intervals with the pattern <Block><Block> . . . . Each <Block> is of the form $I_1, I_2, \ldots I_L$ where each $I_i$ is an IID copy of the idle interval I; a single station transmits successfully after $I_L$; and two or more stations transmit unsuccessfully after each $I_i$ for $i \neq L$.

It may be assumed that the per-station attempt processes evolve independently in the backoff timeline though they evolve with the same p. Then the probability that there is a transmission in at least one of the M superposed per-station processes with attempt rate $\lambda$ each is $1-(1-\lambda)^M$. Therefore the idle interval I is a geometric random variable with success probability $1-(1-\lambda)^M$.

An idle interval $I_i$ is followed by a collision with aggregate collision probability $p_A$, which is the probability that two or more transmissions start in a slot given that there is at least one transmission. That is $$p_A = \frac{1-(1-\lambda)^M - M\lambda(1-\lambda)^{M-1}}{1-(1-\lambda)^M}$$

Assuming that collisions are independent, L is geometric with success probability $1-p_A$. It is noted that $p_A \neq p$, the per-station collision probability, because two or more frames collide in any collision.

c. Aggregate Attempt Process in Real Timeline

Figure 6:
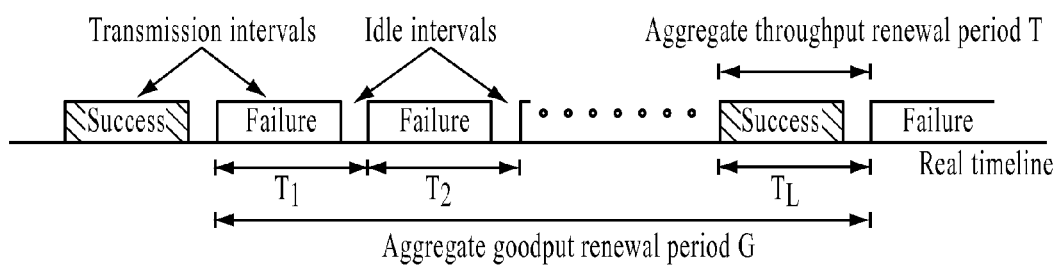
FIG. 6 illustrates an exemplary aggregate renewal period.

The aggregate attempt process in the real timeline is a sequence of intervals with the pattern <Block><Block>.... Each <Block> being of the form $T_1, T_2, \ldots, T_L$, where each $T_i$ is an IID copy of $T=I+\tau$ and only $T_L$ is successful (as discussed above). Thus, the aggregate throughput process is a renewal process with period T. With $E[T]=E[I]+\tau$ and $Var[T]=Var[I]$, by the central limit theorem for renewal processes. Thus, the aggregate throughput (i.e., number of throughput renewals including both successes and failures) in $[t, t+\delta]$ is normally distributed with mean $\delta Var[T]/E[T]^3$. The random variable $N_A(t)$ is normally distributed with mean $\delta/E[G]$ and $\delta Var[G]/E[G]^3$. G is the aggregate goodput renewal period, or the time between two successful transmissions. FIG. 6 illustrates aspects of an aggregate attempt process in a real timeline.

Because each throughput renewal has an idle interval I that is geometrically distributed, the aggregate idle interval in $[t, t+\delta]$ would be the sum of a (normally distributed) random number of geometric random variables. The mean and variance of the total backoff compound random variable may be computed and its distribution approximated by a normal distribution.

Alternatively, this random variable may be approximated by a constant that is equal to its mean, namely, $\delta E[I]/(E[I]+\tau)$, or $\delta\eta$, where $\delta=E[I]/(E[I]+\tau)$. This contraction approximation simplifies the analysis for the per-station instantaneous goodput $N_i(t)$, which otherwise would have needed conditioning and unconditioning on the aggregate idle interval in $[t, t+\delta]$. This assumption is justified because the deviation of the aggregate idle interval is very small relative to the mean (<8% for $\delta=50$ ms), which is because the deviation in the number of throughput renewals is not high relative to its mean.

IV. Obtaining the Distribution $Pr(N_i(t)|C_i(t))$

The conditional distribution of the instantaneous per-station goodput $N_i(t)$ of a tagged station i may be obtained conditioned on its MAC state at the beginning of the timestep. This may include conditioning on the contention window $Ci(t)$ and approximating the backoff counter $B_i(t)$ in terms of $Ci(t)$.

To obtain the distribution of $Pr(N_i(t)|C_i(t))$, the per-station attempt process for station i in the backoff timeline may be considered; and the required distribution may be obtained in terms of the distribution of the total backoff duration X in a packet's lifetime. For the case <$C_i(t)=0; B_i(t)=0$>, i.e., the station transmitted successfully just before t and starts attempts for a new packet just after t, we obtain $Pr(N_i(t)=n)$ as the probability of fitting n copies of X within a total backoff of $\eta\delta$ in the timestep. For an arbitrary starting state, first, the distribution of $X_f^*$ is obtained, where $X_f^*$ is the time to the first successful transmission in the interval conditioned on <$C_i(t); B_i(t)$>. Conditioned on $X_f^*$, the distribution of $N_i(t)$ can be obtained by fitting copies of X in $\eta\delta-X_f^*$, as in the previous case. Finally, $B_i(t)$ is unconditioned to obtain the distribution of $Ni(t)$ conditioned on $C_i(t)$ alone.

Obtaining $Pr(N_i(t)|C_i(t))$ may further include the steps of obtaining the distribution of $N_i(t)$ for a number of starting states. For example, this may include obtaining $Pr(N_i(t)|C_i(t)=0, B_i(t)=0)$, obtaining $Pr(N_i(t)|C_i(t)=y2^{c-1}, B_i(t)=b)$, and obtaining $Pr(N_i(t)|C_i(t)=y2^{c-1})$.

a. Obtaining $Pr(N_i(t)|C_i(t)=0, B_i(t)=0)$

Figure 7:
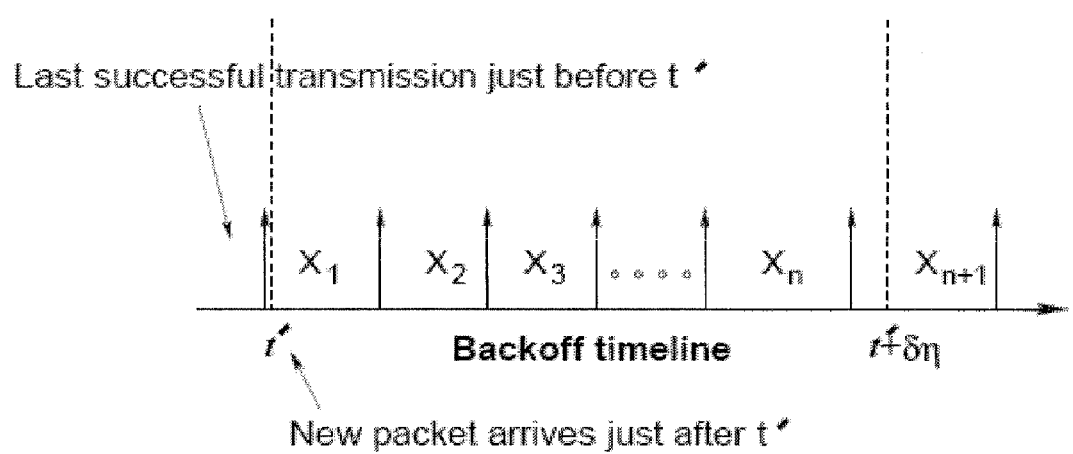
FIG. 7 illustrates an exemplary backoff timeline.

FIG. 7 illustrates successful transmissions of the tagged station i in the corresponding interval in the backoff timeline given by $[t', t'+\delta\eta]$. The interval $[t, t+\delta]$ is $[t', t'+\delta\eta]$ in the backoff timeline. The backoff duration between two successful transmissions is $X_i$, an IID copy of the total backoff duration X in a packet's lifetime. There are n successful transmissions in the interval $[t', t'+\delta\eta]$ if n IID copies of X when added is less than the total backoff duration $\delta\eta$ or in the interval and the $n+1^{th}$ successful transmission occurs outside the interval.

Let $E_1$ denote the event $X_1+\ldots+X_n \leq \eta\delta$ and $E_2$ denote the event $X_1+\ldots+X_{n+1} \leq \eta\delta$. Clearly $E_1 \subset E_2$. Denoting the probability of n successful transmissions in a backoff timeline interval of length $\eta\delta$ as $h(n, \eta\delta)$ we have $$\begin{aligned}h(n, \eta\delta) &= Pr(N_i(t) = n \mid C_i(t) = 0, B_i(t) = 0)\\ &= Pr(X_1+\ldots+X_n \leq n\delta \wedge X_1+\ldots+X_{n+1} > \eta\delta)\\ &= Pr(E_1 \wedge \overline{E_2})\\ &= Pr(E_1) - Pr(E_2)\text{(since }E_1 \subset E_2)\\ &= F_X^n(\eta\delta) - F_X^{n+1}(\eta\delta)\end{aligned}$$

where pdf $f_x^n$ of the distribution $Pr(X_1+X_2+\ldots+X_n)$ is the n-fold convolution of $f_x$ with itself, and $F_x^n$ denotes the corresponding cdf (cumulative distribution function) Once $f_x^n$ has been obtained (which is described in more detail below), the pdf $h(n, \eta\delta)$ can be obtained as above. As shown above, $h(n, \eta\delta)$ depends solely on $\eta$ and $\delta$.

b. Obtaining $Pr(N_i(t)|C_i(t)=y2^{c-1}, B_i(t)=b)$

Figure 8:
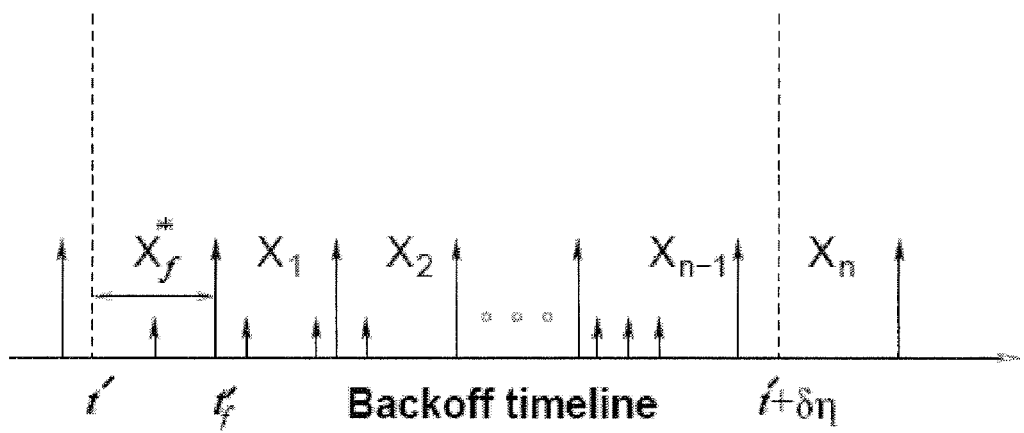
FIG. 8 illustrates an exemplary backoff timeline.

Obtaining $Pr(N_i(t)|C_i(t)=y2^{c-1}, B_i(t)=b)$ includes obtaining the distribution of $N_i(t)$ given an arbitrary starting state $C_i(t), B_i(t)$. FIG. 8 illustrates an interval $[t', t'+\eta\delta]$ in the backoff timeline corresponding to the interval $[t, t+\delta]$ in the real timeline. At time t', the state is not <0,0> and the first successful transmission occurs at $t'_f$. One may define $X_f^*$ to be the time to first success in the backoff timeline given $C_i(t), B_i(t)$, i.e., $X_f^* \triangleq t'_f - t'$. Conditioned on $X_f^*$, $Pr(N_i(t)=n)$ is given by $h(n-1, \eta\delta-X_f^*)$, the probability of n-1 successes in the backoff timeline interval $\eta\delta-X_f^*$ starting from the neutral state at $t'_f$. This is because the first successful transmission occurs at $t'+X_f^*$ and n-1 more occur in the interval of length $\eta\delta-X_f^*$ with probability $h(n-1, \eta\delta-X_f^*)$. Thus, one wants to obtain the probability distribution function (pdf) of backoff time to the first success $X_f^*$.

Given $C_i(t)=y2^{c-1}, B_i(t)=b$, the first transmission occurs at $t'+b$ in the backoff timeline. The number of further attempts K (which can be zero) before a successful transmission at $t'_f$ is distributed according to a geometric distribution with $$\begin{aligned}Pr(K = i) &= (1-p)p^i \quad \text{for } i = 0 \leq i \leq \beta - c\\ &= p^{\beta-c} \quad \text{for } i = \beta - c\end{aligned}$$

Therefore, the total backoff duration until $t'_f$ is $b+Y_{c+1}+Y_{c+2}+\ldots+Y_{c+K}$. Each of the $Y_i$s is uniformly distributed in increasing intervals and the number of attempts K is bounded by $\beta$ and so this pdf can be obtained by straightforward convolution.

For example, $$Pr(X_f^* = l \mid B_i(t) = b, C_i(t) = \gamma 2^{c-1}) = \sum_{i=1}^{i=\beta-c} Pr(b + Y_c + \ldots + Y_{c+i} = l) Pr(K = i)$$

$$Pr(N_i(t) = n \mid X_f^*) = h(n - 1, \eta\delta - X_f^*)$$

Using these equations, one obtains $$Pr(N_i(t) = n \mid B_i(t) = b, C_i(t) = \gamma 2^{c-1}) = \sum_{l=0}^{l=\eta\delta} Pr(X_f^* = l \mid B_i = b, C_i = \gamma 2^{c-1}) \times h(n - 1, \eta\delta - l)$$

c. Obtaining $Pr(N_i(t)|C_i(t)=y2^{c-1})$

If $C_i(t)=y2^{c-1}$, then $B_i(t)$ was chosen from the Uniform $[0 \ldots C_i(t)-1]$ when it was renewed. Therefore, at a given t, the distribution of $B_i(t)$ is distributed according to the forward recurrence time (or remaining/residual time) of the distribution Uniform$[0 \ldots C_i(t)-1]$. For a random variable U~Uniform$[0 \ldots a]$, the forward recurrence time is a random variable $U^+$ whose distribution is given by $$Pr(U + = k) = Pr(U > k)/E[U]$$
$$= [(a - x)/(a + 1)]/(a/2)$$
$$= [2(a - x)]/[a(a + 1)]$$

Thus, we have $Pr(B_i(t)=b|C_i(t)=y2^{c-1})=[2(C_i(t)-b-1)]/[C_i(t)(C_i(t)-1)]$ for $b^\epsilon[0, C_i(t)-1]$. Thus, $Pr(N_i(t)|C_i(t), B_i(t))$ and $Pr(B_i(t)|C(t))$ may be obtained. Then, unconditioning $B_i(t)$ gives $Pr(N_i(t)|C_i(t))$ Using these steps allows a quantification of the short-term unfairness over arbitrary fixed intervals ($\delta$ here) even with no hidden terminals.

In order to evaluate the pdf obtained above, the method may further include obtaining the n-fold convolution $f_x^n$ of the pdf $f_x$ of the total backoff duration X in a tagged packet's lifetime. $f_x^n$ will have $\beta^n$ terms in general.

The weights $w_i$, being the probability of i consecutive losses, decrease exponentially with increasing i. Therefore, not all $w_i$ are equally significant.

Figure 9:
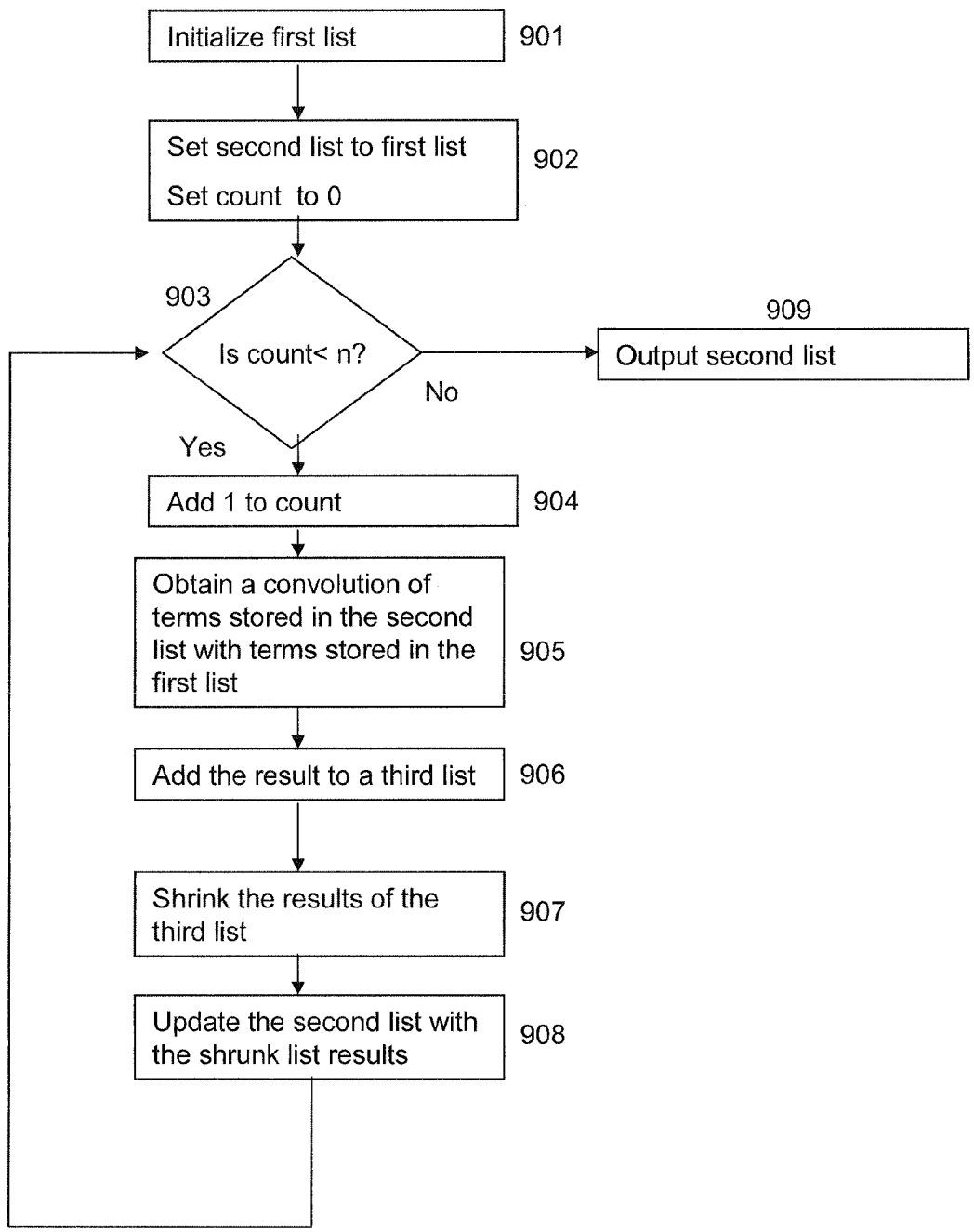
FIG. 9 illustrates an exemplary method implementing a convolving algorithm in accordance with aspects of the present invention.

A term-by-term convolution of the $\beta^n$ terms yields several Gaussian terms whose means (m) and deviations (s) are close enough to be approximated by a single term which absorbs the weights of such close terms FIG. 9 illustrates a method for efficiently approximating a convolution of $f_x^n$.

In 901, a first list (also referred to interchangeably as the init-list) is set to a list of entries in the form of $<w_i, (m_i, s_i)>$ in $f_x$. In 902, count is set to zero and a second list (also referred to interchangeably as the curr-list) is set to the first list. In 904, a determination is made as to whether the count has reached n. If the count is less than n, in 903, 1 is added to the count, in 904, and in 905, a convolution is computed of terms $f'_x$ (stored as the curr-list or second list) with $f_x$ (stored in the init-list or first list). This may be done by for each $<w_i, (m_i, s_i)>$ in init-list
  for each $<w_j, (m_j, s_j)>$ in curr-list
    $m \leftarrow m_i + m_j$; $s \leftarrow \sqrt{s_i^2 + s_j^2}$; $w \leftarrow w_i \times w_j$ In 906, the results of this convolution $<w, (m, s)>$ are added to a third list (the third list is also referred to interchangeably as new-list). In 907, the obtained result is shrunk. This may be done using aspects of the method described in connection with FIG. 10.

Then, in 908, the second list (curr-list) is updated with the shrunk list results. The method then returns to 903. This continues until the count equals n. At that point, the second list is output. Thus, $f'^{+1}_x$ can be computed from $f'_x$.

FIG. 10 illustrates aspects of a method for shrinking new-list using new-list as a parameter and curr-list is updated from the return value. This may be the new list from the method of FIG. 9. New-list may contain tuples of the form $<$weight "w", (mean "m", deviation "s")$>$. The list entries may be sorted in lexicographically increasing order according to the tuples $(m_k, s_k)$. $<w, (m, s)>$ is maintained as the candidate entry to be added to the shrunk list.

For each entry, $w_k$ is compared to a predetermined threshold. The threshold is typically small, such as around 0.001. If $w_k$ is less than the threshold, the entry $<w_k, (m_k, s_k)>$ is ignored by simply adding $w_k$ to current candidate weight was in line 7. for the next entry in the list in 1006.

If $w_k$ is significant and $m_k$ and $s_k$ are comparable to the current m and s values then m and s are combined with $m_k$ and $s_k$, respectively, after weighting by w and $w_k$, as in lines 9-11. For example, it is determined if $|m_k-m| \leq \theta m$ and $|s_k-s| \leq \theta ms$. $\theta$ is a closeness parameter and is less than 1. For example, $\theta$ may be about 0.1 If $m_k$ and $s_k$ are determined to be close to the current m and s values. The value for m and s may combined with $m_k$ and $s_k$ for example, by $$p_1 \leftarrow w/(w_k+w); p_2 \leftarrow w_k/(w_k+w)$$

$$m \leftarrow p_1 m + p_2 m_k; s \leftarrow \sqrt{p_1 s^2 + p_2 s_k^2 + p_1 p_2 (m-m_k)^2}$$

$$w \leftarrow w + w_k$$

If $w_k$ is significant, and $<w_k, (m_k, s_k)>$ cannot be combined with $<w, (m, s)>$ then $<w, (m, s)>$ is added to the shrunk list and the shrinking continues with $<w_k, (m_k, s_k)>$ becoming the new candidate shrunk-list entry to be considered for the shrunk list, as in lines 13 to 14. Once each of the entries have been considered, a shrunk-list is output.

These methods can reduce the amount of runtime required to obtain a convolution. Aspects of these optimizations are based on the observation that we are interested in the pdf's of the n-fold convolutions for support points lesser than $\delta\eta$, the total backoff in a timestep of length $\delta$.

Suppose $F'^{n*}_x(\delta\eta) \approx 0$ for some $n^*$, i.e., the probability that $X_1 + X_2 + \ldots + X_{n^*}$ takes a value lesser than $\eta\delta$ is negligible, then the algorithm for computation of the convolution can be halted at $n^*$ because for any $n>n^*$, $F'^{n*}_x(\eta\delta) \approx 0$ and does not give any more information required for obtaining $P(N_i|C_i)$ and the other pdf's for timesteps of length $\delta$.

Another related optimization is to represent the n-fold partial convolution only up to an interval length of $\delta\eta$ rather than over the entire support range of O(na). Thus this would help optimize both the gaussian approximation method as well as the FFT-based approach.

The results of the approximation work well and offer a significant speed up in calculation time. These benefits are described in more detail in "Timestepped Stochastic Simulation of 802.11 WLANS* by Arunchandar Vasan, at http://hdl.handle.net/1903/8533, the entire contents of which are incorporated herein by reference.

V. Dependent Sampling of Per-Station Goodput $N_i(t)$ from $Pr(N_i(t)|C_i(t))$

The goodput sample $Ni(t)$ of an active station i in $[t; t+\delta]$ may be determined by two factors: 1) its initial state $C_i(t)$; and 2) its interaction with all other active stations in $[t; t+\delta]$. If $C_i(t)$ is too high, with high probability, i will not attempt often enough to possibly get a high goodput. Likewise, if the goodputs obtained by other stations are high, then $Ni(t)$ will necessarily go down since there is only so much channel capacity in $[t; t+\delta]$. By obtaining, $Pr(N_i(t)|C_i(t))$, such as in 408 in connection with FIG. 4, one captures the effect of the first factor by approximating the interaction with all other stations by a constant per-attempt collision probability in $[t; t+\delta]$. If the $N_i(t)$ were independent of each other, all that needs to be done is to sample each $N_i(t)$ from the distribution $Pr(N_i(t)|C(t))$. However, in reality, the interactions within stations in $[t; t+\delta]$ ensures that $N_i(t)$ is correlated with every $N_j(t)$ for $i \ne j$. Further, because $C_i(t+\delta)$ depends on $N_i(t)$, the states of all stations are also weakly correlated.

The marginal goodput distribution does indicate that if the number of active stations goes up, the per-station collision probability goes up and hence the range of values of $N_i(t)$ goes down. However, the extent of correlation will not be captured adequately by this abstraction of other stations, because the random variables are abstracted by some form of average behavior.

Thus it is beneficial to sample $N_i(t)$'s from their conditional distributions in a manner that reflects their negative correlation accurately. FIG. 11 illustrates a method applying a randomized algorithm in order to dependently sample the conditional distributions. Aspects of this method include ordering stations according to a random permutation, and sampling a station's marginal distribution according to the sum of the samples of all goodputs allocated prior to it.

In 406 in FIG. 4, the distribution of the aggregate goodput $N_A(t)$ independent of any constraint (even from $N_A(t-\delta)$) was obtained. Then, in 407, $N_A(t)$ was sampled from its distribution. In connection with 409, sampling of $N_i(t)$ should be such that the sum of $N_i(t)$ adds up to the sampled $N_A(t)$. If the $N_i(t)$ were chosen independent of each other, the variance of the sum would be cumulative and not be as low as $Var[N_A(t)]$, which is a result of the negative correlation. Thus, the constraint $N_A(t) = \Sigma N_i(t)$ requires that $N_i(t)$ be sampled in a way reflecting the negative correlation.

In lines 4 and 5, $N_A(t)$ is sampled from $Pr(N_A(t))$. Each iteration of the while loop from lines 6 through 22 assigns the goodput of the station i chosen in the position count of the random permutation. The variable "count" keeps track of the number of stations that have been allotted goodputs, out of a total of M stations. The variables allotted and expected represent the actual and expected goodput allocated to count number of stations with allowable tolerance upper-tolerance and lower-tolerance If the variables are below M and $N_A(t)$, respectively, i becomes $\pi(count)$, where $\pi$ is a random permutation of 1 . . . M, as in lines 6 and 7.

It is then determined whether allotted>expected−upper-tolerance. This checks whether the actual allotted goodput for the count −1 stations is higher than expected subject to an upper-tolerance. If so, then a tentative sample is obtained from the lower tail of $Pr(N_i(t)|C_i(t))$ in line 9. A determination is also made as to whether allotted<expected−lower-tolerance. This determines whether the actual allotted goodput for the count −1 stations is lower than expected subject to a lower-tolerance. If so, then a tentative sample is obtained from the upper tail of $Pr(N_i(t)|C_i(t))$ in line 11.

If n* is a goodput such that $Pr(N_i \le n^*|C_i) = \frac{1}{2}$, sampling the lower tail of $Pr(N_i(t)|C_i(t))$ means sampling from the distribution $Pr(N_i|C_i, N_i \le n^*)$. Sampling the upper tail of $Pr(N_i(t)|C_i(t))$ means sampling from the distribution $Pr(N_i|C_i, N_i > n^*)$.

If neither the upper and lower tolerance is exceeded, then a sample is obtained from the full distribution of $Pr(N_i(t)|C_i(t))$ in line 13.

As long as the tentative sample s taken with the goodput allocated so far does not exceed the sampled $N_A(t)$, as checked in line 14, then $N_i(t)$ is set to s in line 15. If the tentative sample s taken with the goodput allocated so far does exceed the sampled $N_A(t)$, $N_i(t)$ is assigned the residual goodput or $N_A(t)$-allotted in line 17 and the assignment stops. In lines 18-22 the variables are updated. The variables are updated by setting:

$$allotted = allotted + N_i(t)$$

$$count = count + 1$$

$$expected = expected + count \times (N_A(t)/M)$$

$$upper\text{-}tolerance = \theta 1 \times expected$$

$$lower\text{-}tolerance = \theta 2 \times expected.$$

The last station in the random permutation $\pi$ is assigned the residual goodput if any, or $N_{\pi(M)}(t) = \max(N_A(t)-allotted, 0)$ in line 24.

As discussed above, all pdf's may be precomputed or cached after computation during the simulation run. Because this has a one-time fixed time cost, it allows for increased efficiency during simulation. The random permutation can be generated, for example, in O(M) time by a Knuth shuffle. Each iteration of the while loop takes O(1) time to sample a random variable from a distribution (independent of the pdf size by building and indexing a table of the inverse of the cdf) and update state variables. Because there are at most M−1 iterations of the loop, the runtime needed to sampled the goodputs as in FIG. 11 takes O(M) deterministic time. Even the most efficient implementation of a packet level simulator would take O(M$\delta \times$bit-rate) because each packet-transmission by any station schedules events in the other M−1 stations. Thus, TSS scales much better with increasing bitrates.

VI. Conditional Distribution of New MAC State

In order to complete the inductive step of TSS in each timestep, the MAC state is updated at $t+\delta$ by obtaining $C_i(t+\delta)$ in 410 and 411.

This includes obtaining the distribution $Pr(C_i(t+\delta)|C_i(t), N_i(t))$ of the new MAC state given the old state $C_i(t)$ and the goodput $N_i(t)$ that was obtained after accounting for correlation, as in 410. In 411, the new state is sampled from the distribution. This includes analyzing the per-station attempt process in the backoff timeline and obtaining the distribution of the time instant of the last successful packet transmission in the interval. Given the instant of the last successful transmission, the distribution of the new state can be obtained by applying Bayes theorem.

a. With Non-Zero Goodput

Figure 12:
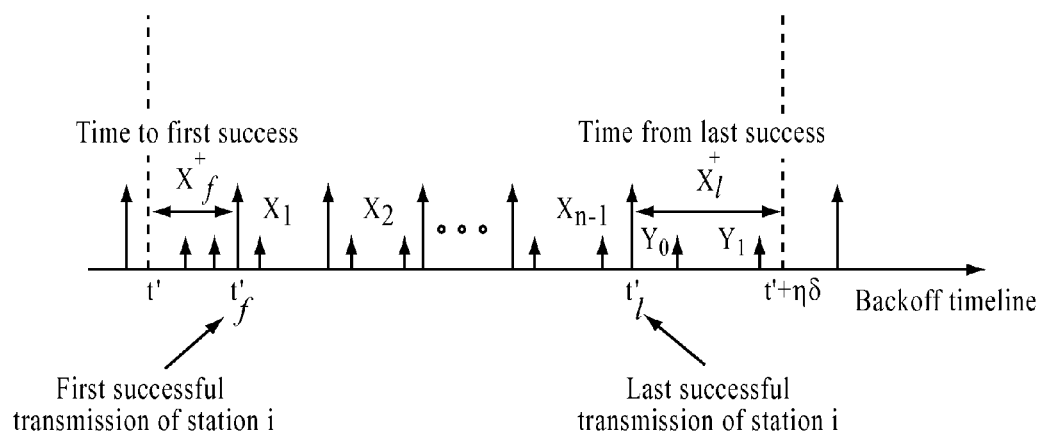
FIG. 12 illustrates an exemplary backoff timeline in accordance with aspects of the present invention.

FIG. 12 illustrates transmissions of a tagged station in the backoff timeline interval $[t', t'+\eta\delta]$ corresponding to real timeline interval [t, t+δ]. A longer arrow indicates a successful transmission, and a shorter arrow indicates a failure. In this backoff timeline, $X_f^*$ is the backoff time to the first success from the beginning of the interval. Likewise, $X_l^*$ is the backoff time from the last success to the end of the interval. If the goodput for the station is nonzero, because $N_i(t) \neq 0$, $X_f^*$ and $X_l$ are well defined. A method for obtaining the distribution of the backoff time to the first success $X_f^*$ was described above. Obtaining $Pr(X_l^*|C_i(t), N_i(t))$ allows the distribution of $C_i(t+\delta)$ to be obtained given that $X_l^*$ slots have been spent in backing off since the last successful transmission. $Pr(N_i(t)=n|C_i(t))$ can be rewritten as $$Pr(N_i(t) = n \mid C_i(t)) = \sum_{r=0}^{r=\eta\delta} Pr(X_f^* = r \mid C_i(t)) \sum_{s=0}^{s=\eta\delta-r} f(r, s)$$

where $$f(r, s) \stackrel{\Delta}{=} Pr(X_1 + \ldots + X_{n-1} = s)Pr(X_n > \eta\delta - r - s)$$

By Bayes' theorem, $$Pr(X_l^* = s \mid N_i(t) = n_i C_i(t)) = \frac{f(r, \eta\delta - r - s) \sum_{r=0}^{r=\eta\delta-s} Pr(X_f^* = r \mid C_i(t))}{Pr(N_i(t) = n \mid C_i(t))}$$

If $X_f^*=x$, this means that the total backoff $X_n$ of the n+1th successful transmission is greater than x. Recall the notation that $Y_1, \ldots, Y_K$ are the backoff counter values chosen in successive transmission attempts of a tagged packet, if there are successive transmission attempts at all. For $C_i(t+\delta)=2^{c-1}y$ to occur after spending a backoff duration x from a reset state $<C_i(t)=0; B_i(t)=0>$, we want c−1 unsuccessful transmissions, $Y_1+\ldots+Y_c$ to just exceed x, and $Y_1+\ldots+Y_{c-1}$ should be less than x. Therefore, we have $$Pr(C_i(t+\delta) = 2^{c-1}\gamma \mid X_l^* = x) = p_f^{c-1} \frac{Pr(Y_1 + \ldots + Y_{c-1} \leq x \wedge Y_1 + \ldots + Y_c > x)}{Pr(X_n > x)}$$

$$= p_f^{c-1} \frac{Pr(Y_1 + \ldots + Y_{c-1} \leq x) - Pr(Y_1 + \ldots + Y_c \leq x)}{Pr(X_n > x)}$$

Unconditioning on $X_l^*$ yields $Pr(C_i(t+\delta)|C_i(t), N_i(t))$ b. With Zero Goodput When $N_i(t)=0$, $B_i(t)$ may be approximated as the forward recurrence time of $C_i(t)$. Note that because the goodput is zero, the transmission attempts, if any, are all unsuccessful. Specifically, if the station makes k unsuccessful attempts, then the time spent for backoff in the timestep for the first transmission is $B_i(t)$. Now let backoff times for each of the remaining k−1 attempts be $Y_{i1}, Y_{i2}, \ldots, Y_{ik-1}$. The new $C_i(t+\delta)$ corresponds to $C_i(t)$ and ik−1 unsuccessful attempts if $B_i(t)+Y_{i1}+\ldots+Y_{ik-1}$ just exceeds $\eta\delta$. Thus the probability distribution of the new MAC state may be obtained by convolving the distributions of the $Y_i$'s and $B_i(t)$.

VII. Overview of 802.11 DCF and Modeling Assumptions

Each evolution of 802.11 DCF consists of a sequence of successful or unsuccessful (collision) transmission intervals separated by various idle intervals. A successful packet transmission has a transmission interval τ that consists of (1) the time to put the packet on the air (equals packet size divided by bitrate for data), (2) the Short Inter-Frame Spacing (SIFS) interval (which is the period separating a packet from its ACK transmission, (3) the time to put the ACK on the air (equals ACK size divided by bitrate for ACK), and (4) the DCF Inter-Frame Spacing (DIFS) (which is the minimum period separating an ACK from the next data frame). An unsuccessful transmission also has the same transmission interval τ.

Figure 13:
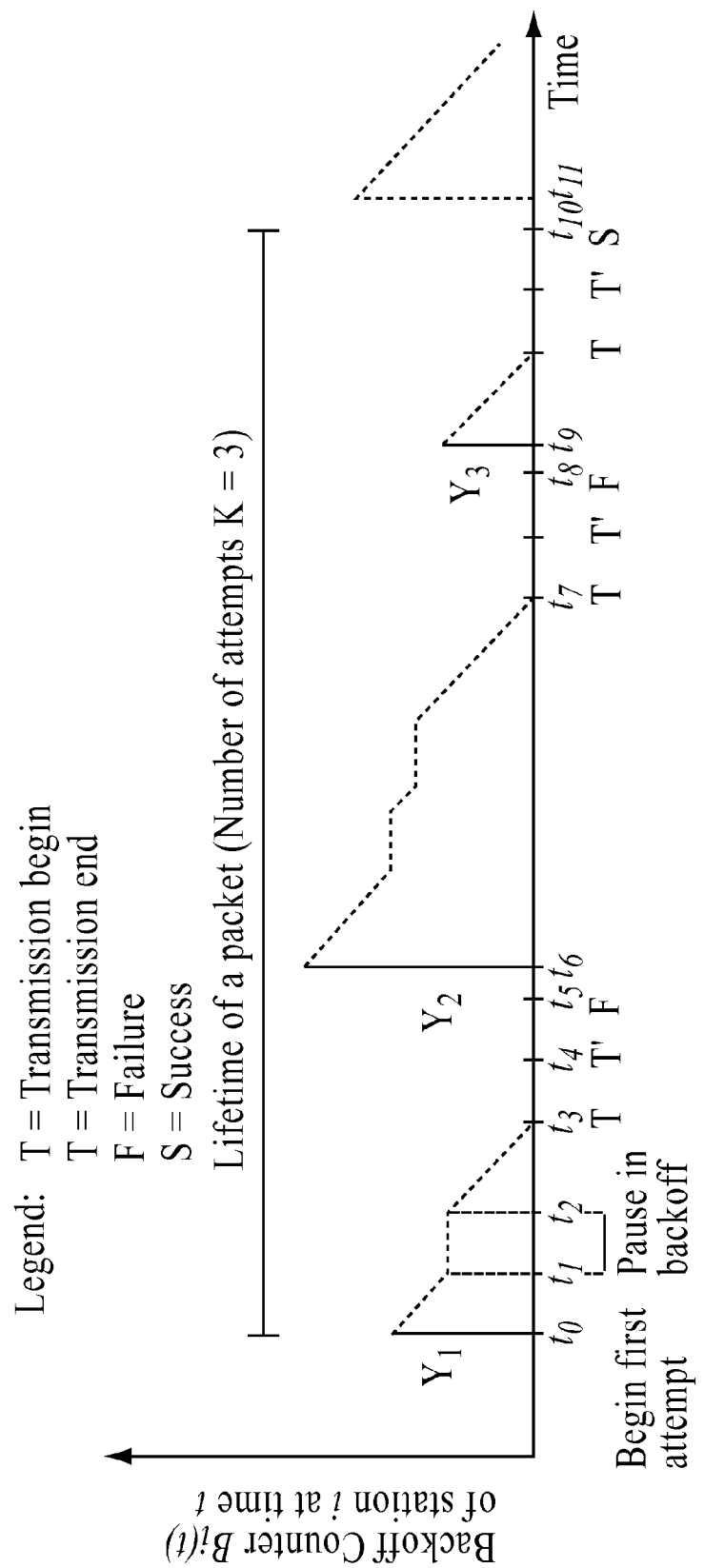
FIG. 13 illustrates an evolution of $B_i(t)$ during a packet's lifetime in accordance with aspects of the present invention.

FIG. 13 illustrate an evolution of $B_i(t)$ during a packet's lifetime at station i. $C_i(t)$ changes at $t_5$ and $t_8$ to 2y and 4y, respectively, y being the initial contention window size. FIG. 14 illustrates a number of notations for an 802.11 operation.

Specifically, stations respond to a collision as follows: If a receiving station's physical layer deciphers an 802.11 packet with a checksum error (due to a collision or noise), then the station waits for an EIFS (Extended Inter-Frame Spacing defined to be SIFS+ACK+DIFS) after the end of the colliding transmissions before resuming its backoff.

If a receiving station's physical layer cannot decipher any 802.11 frame (even with a checksum error) from the collision, then it waits only for DIFS after the end of the colliding transmissions before resuming backoff A transmitting station always starts backing off only after DIFS+ACK−Timeout (specified to be ACK+SIFS in the Systems Description Language appendix) irrespective of whether the transmission succeeded or failed.

In the case of receiving stations, the common case appears to be the reception of a frame in error rather than the non-reception of any frame. Therefore, aspects of the present invention include choosing the same transmission interval for both collision and success. It is noted that the use of RTS/CTS implies different transmission intervals for successful and unsuccessful transmissions.

In addition to the DIFS duration, the ACK of each transmission is separated from the next frame by a variable idle interval that is determined by the protocol operation.

FIG. 13 shows one possible evolution of the backoff counter $B_i(t)$ of a tagged station i that gets a packet to transmit at time instant $t_0$. The following steps occur. The MAC state $<C_i(t_0^-), B_i(t_0^-)>$ just before $t_0$ (denoted by $t_0^-$) is the idle state $<0,0>$.

At $t_0$, the station chooses an initial backoff counter value $Y_1$ from Uniform[0 . . . y−1]. Thus the MAC state $<C_i(t_0^+), B_i(t_0^+)>$ just after $t_0$ is $<y, Y_1>$.

The station senses the medium. As long as the channel is idle, $B_i$ is decremented at the rate of one per slot (in the figure, the decrease is shown as continuous). Whenever the medium is busy (due to another station transmitting), the decrementing is paused as shown between $t_1$ and $t_2$.

At time $t=t_3$, $B_i(t)$ becomes zero and the station starts the transmission of the packet and finishes it at $t_4=t_3+PKT$ (time to transmit a packet)

No ACK is received within the standard timeout duration of SIFS+ACK. So at time $t_5=t_4+SIFS+ACK$, the station doubles $C_i(t)$ to 2 and chooses a new random backoff counter value $Y_2$ from Uniform[0 . . . 2 y−1]. This is the so-called Binary Exponential Backoff (BEB).

The second attempt to transmit begins at time $t_6=t_5+DIFS$.

The second transmission starts at $t_7$ and is decided a failure at time t8.

The third attempt is successful at time instant $t_{10}$ when it receives an ACK. At this point, the MAC state is reset to <0,0> if there are no packets to transmit. If there is a packet to transmit, $C_i$ becomes y and a new value or $B_i$ is chosen from Uniform[0 . . . y−1].

If successful transmission does not occur within β (retry limit) attempts, then the packet is aborted and the MAC state is reset to <0,0>. Thus, for evolution of the MAC state, an abort is equivalent to a success. The lifetime of a packet refers to the time elapsed from the start of the first transmit attempt to the end of either its successful transmission or abort.

Figure 15:
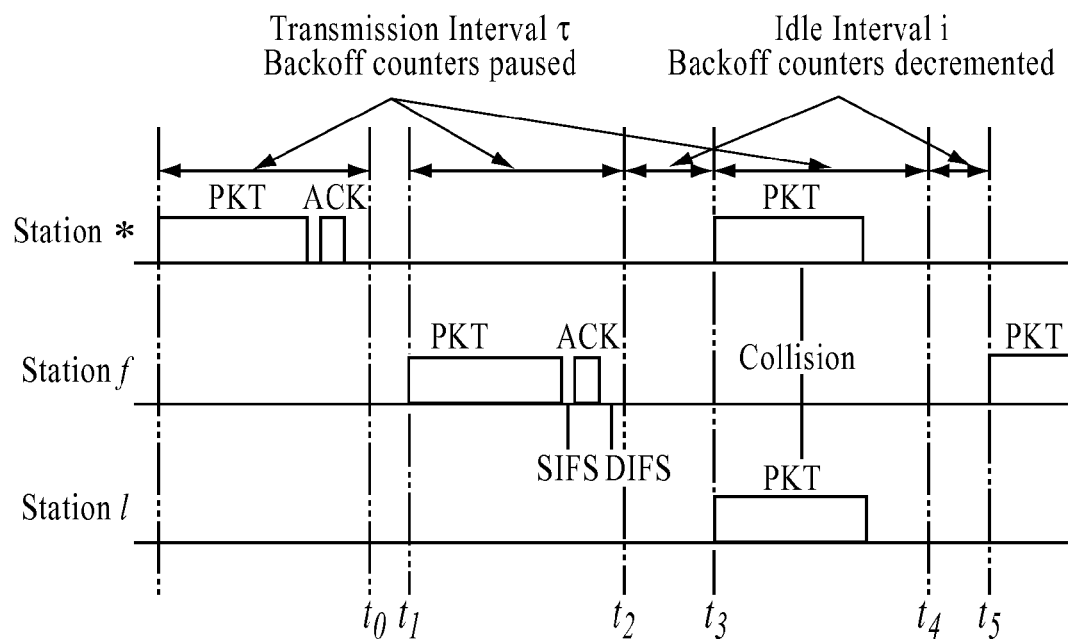
FIG. 15 illustrates WLAN wide transmissions and associated timing details in accordance with aspects of the present invention.

The sequence of transmission attempts of a station is referred to as its attempt process. Each station in the system executes the same protocol. So each station has its per-station attempt process. The super-position of the per-station attempt processes results in the WLAN-wide aggregate attempt process as shown in FIG. 15. A collision occurs if two or more stations start transmission in the same slot. Because collisions waste the channel, DCF tries to minimize collisions by performing BEB.

FIG. 15 shows the WLAN-wide transmissions and the associated timing details during the interval $[t_0, t_6]$ of FIG. 13. At $t_0$ station i gets a packet to transmit and starts the backoff procedure. From time $t_1$ through $t_2$, station j transmits a packet, so backoff counters of all stations remain unchanged in the interval $[t_1; t_2]$. Finally station i makes the first attempt at time $t_3$ resulting in a collision. Station j transmits the next packet after $t_6$.

Now consider the variable period preceding a packet transmission (for instance, the period between $t_2$ and $t_3$) during which backoff counters of all stations are decremented. This variable period is called the idle interval and is denoted by I. The value of I before a transmission is determined by the minimum of the backoff counters of all stations at the end of the preceding transmission. Note that I does not include the fixed overhead SIFS+ACK+DIFS after each packet transmission.

a. Modeling Assumptions

A number of assumptions are made in developing the transient analysis of 802.11 DCF. FIG. 16 lists a symbol information and modeling assumptions for certain quantities. The quantities are defined for a time interval. All quantities termed constant can vary only at the boundaries of timesteps. All quantities measuring time (δ, I, τ) may be in 802.11 slots Within a given timestep, it is assumed that the number of stations with packets to transmit is constant and denoted by M; the set of stations is denoted M.

It is assumed that each attempt by a tagged station is a collision with per-station probability p dependent only on M ("per-station" distinguishes this from the aggregate collision probability).

It is assumed that the transmission interval of a collision is the same as that of a successful packet transmission, as explained above.

It is assumed that the per-station collision probability p is constant within a timestep and can be obtained as a function of M (either by an empirical model of by a fixed point iteration as in reference).

It is assumed that there are no aborts. For standard values of protocol parameters, the probability of an abort is $p^β$ is negligible (e.g., <0.007 for p<0.5 and β+7).

It is assumed that each idle interval is an IID copy of a stationary random variable I.

All quantities that are assumed constant within a timestep can change over the course of a TSS run at timestep boundaries. The following may be assumed across all timesteps for the entire run of a TSS simulation:

It may be assumed that RTS/CTS exchanges are not used.

It may be assumed that every successful transmission is received at all stations (i.e., no hidden or exposed terminals) and all packets involved in a collision result in checksum errors at receivers (i.e., no physical layer capture).

It may be assumed that the transmission bitrates are constant.

It may be assumed that packet size is constant.

Figure 17:
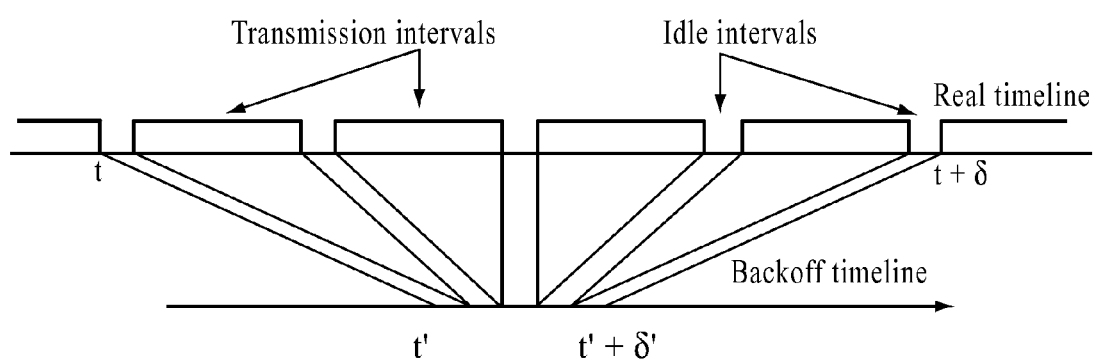
FIG. 17 illustrates an exemplary real timeline to backoff timeline contraction approximation in accordance with aspects of the present invention.

The backoff timeline may be defined to be the sequence of all idle intervals ordered by their occurrence time. In other words, the transmission intervals in the real timeline are collapsed to points to obtain the backoff timeline. FIG. 17 illustrated the real-to-backoff timeline contraction approximation. Note that an interval of δ slots in the real timeline would on average have δ E[I]=(E[I]+τ) idle interval slots. So the δ interval would on average correspond to an interval ηδ in the backoff timeline, where η≜E[I]=(E[I]+τ). To simplify the analysis, it may be assumed that the variability from the average is negligible. That is any interval of length δ slots in the real timeline contracts (corresponds) to an interval of length ηδ slots in the backoff timeline.

Exemplary variations of aspects of the present invention have now been described in accordance with the above advantages. It will be appreciated that these examples are merely illustrative of aspects of the present invention. Many variations and modifications will be apparent to those skilled in the art.

The invention claimed is:

1. A method for evaluating via a processor the performance of a network comprising a plurality of stations, the method comprising:
   establishing a timestep value;
   analytically generating a plurality of sample paths of a network state, wherein each of the states is simulated at a discrete timestep and wherein each discrete timestep is separated by the established timestep value;
   probabilistically determining at least one Media Access Control (MAC) state characteristic of a station at a timestep t+δ, δ being the timestep value, based on the MAC state characteristic at time t;
   for each station in the network, obtaining a probability distribution of an individual instantaneous goodput at each timestep given the station's MAC state at the start of the timestep;
   dependently sampling the individual instantaneous goodput at each timestep from the obtained probability distribution; and
   outputting network performance information based on the generated sample paths;
   wherein sampling the individual instantaneous goodput at each timestep from the obtained probability distribution further includes:
   applying a randomized algorithm that enforces a negative correlation constraint among any subset of a plurality of stations in the network;
   correlating the individual instantaneous goodput at each timestep such that the sum of the individual instantaneous goodputs for the plurality of stations in the network equals the determined instantaneous aggregate goodput for the network;
   ordering the plurality of stations according to a random permutation; and
   sampling a station's marginal distribution based in part on the sum of all goodputs allocated to it in a prior timestep and an aggregate goodput constraint.

2. The method according to claim 1, wherein outputting network performance information includes displaying or printing the network performance information.

3. The method according to claim 1, wherein the network includes shared links and non-shared links.

4. The method according to claim 1, wherein the network comprises a WLAN.

5. The method according to claim 1, the method further comprising:
determining a per-station collision probability;
obtaining a probability distributions at each timestep Pr[S(t+δ)|S(t)] and Pr[N(t))|S(t)], where t is time and δ is the timestep value, S(t) is the state of the network at time t, and N(t) is the goodput of the network at time t; and
obtaining the state of the network from the probability distributions.

6. The method according to claim 5, wherein analytically generating the plurality of sample paths of the network state further comprises:
precomputing distribution values and storing the distribution values, wherein
the analytically simulating a state of the network includes obtaining at least one distribution value from a cache.

7. The method according to claim 1, wherein analytically generating the plurality of sample paths of the network state further comprises:
quantifying a short-term goodput unfairness conditioned on a DCF state of the network.

8. The method according to claim 1, wherein obtaining the probability distribution of the individual instantaneous goodput includes considering a per-station attempt process in a backoff timeline.

9. The method according to claim 1, wherein the probability distribution of the individual instantaneous goodput is obtained in terms of a distribution of a total backoff duration in a lifetime of a packet.

10. The method according to claim 1, wherein obtaining the probability distribution of the individual instantaneous goodput includes determining a probability distribution for the goodput at a plurality of starting states.

11. The method according to claim 10, further comprising:
obtaining a probability distribution of the MAC state of each station at an adjacent timestep based on the MAC state and goodput at the previous timestep; and
sampling the MAC state of each station at the adjacent timestep from the obtained probability distribution.

12. The method according to claim 11, wherein at least one selected from a group consisting of the probability distribution of the instantaneous aggregate goodput, the probability distribution of the individual instantaneous goodput, and the probability distribution of the MAC state of each station is stored in a cache, the method further comprising:
looking up the value in the cache of at least one selected from a group consisting of the probability distribution of the instantaneous aggregate goodput, the probability distribution of the individual instantaneous goodput, and the probability distribution of the MAC state of each station.

13. The method according to claim 12, further comprising:
calculating the probability distribution value during the simulation; and
caching the probability distribution values.

14. A system for evaluating the performance of a network having α stations, the system comprising:
means for establishing a timestep value;
means for analytically generating a plurality of sample paths of a network state, wherein each of the states is simulated at a discrete timestep and wherein each discrete timestep is separated by the established timestep value, wherein the means for analytically generating a plurality of sample paths of a network state includes:
means for probabilistically determining at least one Media Access Control (MAC) state characteristic of a station at a timestep t+δ, δ being the timestep value, based on the MAC state characteristic at time t;
means for obtaining the probability distribution of the instantaneous aggregate goodput for each station in the network at each timestep given the station's MAC state at the start of the timestep;
means for sampling the instantaneous aggregate goodput at each timestep from the obtained probability distribution;
for each station in the network, means for obtaining the probability distribution of an individual instantaneous goodput given the station's MAC state at the start of the timestep;
means for dependently sampling the individual instantaneous goodput at each timestep from the obtained probability distribution means for obtaining the probability distribution of the MAC state of each station at an adjacent timestep based on the MAC state and goodput at the previous timestep; and
means for sampling the MAC state of each station at the adjacent timestep from the obtained probability distribution; and
means for outputting network performance information based on the generated sample paths;
wherein the means for sampling the individual instantaneous goodput at each timestep from the obtained probability distribution includes:
means for applying a randomized algorithm that enforces a negative correlation constraint among any subset of a plurality of stations in the network;
means for correlating the individual instantaneous goodput at each timestep such that the sum of the individual instantaneous goodputs for the plurality of stations in the network equals the determined instantaneous aggregate goodput for the network;
means for ordering the plurality of stations according to a random permutation; and
means for sampling a station's marginal distribution based in part on the sum of all goodputs allocated to it in a prior timestep and an aggregate goodput constraint.

15. A system for evaluating the performance of a network having α stations, the system comprising:
a processor;
a user interface functioning via the processor; and
a repository accessible by the processor; wherein
the user interface is configured to receive a timestep value; and
the processor is configured to analytically generate a plurality of sample paths of a network state, wherein each of the states is simulated at a discrete timestep and wherein each discrete timestep is separated by an established timestep value, wherein analytically generating the plurality of sample paths of a network state includes:
determining a per-station collision probability;
probabilistically determining at least one Media Access Control (MAC) state characteristic of a station at a timestep t+δ, δ being the timestep value, based on the MAC state characteristic at time t;

for each station in the network, obtaining a probability distribution of an individual instantaneous goodput at each timestep given the station's MAC state at the start of the timestep;

obtaining a probability distributions at each timestep $Pr[S(t+\alpha)|S(t)]$ and $Pr[N(t))|S(t)]$, where t is time, $S(t)$ is the state of the network at time t, and $N(t)$ is the goodput of the network at time t; and obtaining the state of the network from the probability distributions; and wherein the user interface is configured to output network performance information based on the generated sample paths;

wherein analytically generating the plurality of sample paths of the network state further comprises:

sampling the individual instantaneous goodput at each timestep from the obtained probability distribution further including:

applying a randomized algorithm that enforces a negative correlation constraint among any subset of a plurality of stations in the network;

correlating the individual instantaneous goodput at each timestep such that the sum of the individual instantaneous goodputs for the plurality of stations in the network equals the determined instantaneous aggregate goodput for the network;

ordering the plurality of stations according to a random permutation; and sampling a station's marginal distribution based in part on the sum of all goodputs allocated to it in a prior timestep and an aggregate goodput constraint.

16. The system according to claim 15, wherein analytically generating the plurality of sample paths of the network state further comprises:

quantifying a short-term goodput unfairness conditioned on a DCF state of the network.

17. The system according to claim 15, wherein obtaining the probability distribution of the individual instantaneous goodput includes determining a probability distribution for the goodput at a plurality of starting states.

* * * * *